United States Patent
Jha et al.

(10) Patent No.: US 10,508,320 B2
(45) Date of Patent: Dec. 17, 2019

(54) PROCESS FOR RECOVERING PRIMARY METAL RESIDUE FROM A METAL-CONTAINING COMPOSITION

(71) Applicant: UNIVERSITY OF LEEDS, Leeds, West Yorkshire (GB)

(72) Inventors: Animesh Jha, Leeds (GB); Yotamu Stephen Rainford Hara, Leeds (GB); Stephen Parirenyatwa, Leeds (GB); Sergio Sanchez-Segado, Leeds (GB)

(73) Assignee: UNIVERSITY OF LEEDS, Leeds, West Yorkshire (GB)

( * ) Notice: Subject to any disclaimer, the term of this patent is extended or adjusted under 35 U.S.C. 154(b) by 0 days.

(21) Appl. No.: 15/555,144

(22) PCT Filed: Mar. 1, 2016

(86) PCT No.: PCT/GB2016/050530
§ 371 (c)(1),
(2) Date: Sep. 1, 2017

(87) PCT Pub. No.: WO2016/139460
PCT Pub. Date: Sep. 9, 2016

(65) Prior Publication Data
US 2018/0044762 A1 Feb. 15, 2018

(30) Foreign Application Priority Data
Mar. 4, 2015 (GB) .................... 1503635.3

(51) Int. Cl.
C22B 34/00 (2006.01)
C22B 34/12 (2006.01)
C22B 1/02 (2006.01)
C22B 34/24 (2006.01)

(52) U.S. Cl.
CPC .............. *C22B 34/124* (2013.01); *C22B 1/02* (2013.01); *C22B 34/1236* (2013.01); *C22B 34/24* (2013.01); *Y02P 10/212* (2015.11)

(58) Field of Classification Search
CPC ... C22B 34/24; C22B 34/124; C22B 34/1236; C22B 1/02
USPC .............................. 423/81, 83–85
See application file for complete search history.

(56) References Cited

U.S. PATENT DOCUMENTS

| | | | |
|---|---|---|---|
| 2,888,320 A | 5/1959 | McCord | |
| 2,909,427 A | 10/1959 | Rathmann et al. | |
| 2,953,453 A | 9/1960 | Foos | |
| 2,972,530 A | 2/1961 | Zimmerley et al. | |
| 3,057,714 A | 10/1962 | Back et al. | |
| 4,038,363 A | 7/1977 | Jarish | |
| 4,207,295 A | 6/1980 | Kagetsu et al. | |
| 2007/0110647 A1 | 5/2007 | Jha et al. | |
| 2008/0241026 A1* | 10/2008 | Jha ................ | C01G 23/047 423/81 |
| 2009/0311154 A1* | 12/2009 | Jha ................ | C01F 7/142 423/86 |
| 2010/0086454 A1* | 4/2010 | Cooke ............. | C01G 23/047 423/82 |

FOREIGN PATENT DOCUMENTS

| | | | |
|---|---|---|---|
| CA | 2680729 A1 | 3/2010 | |
| GB | 2001042 A | 1/1979 | |
| WO | WO-02/48412 A1 | 6/2002 | |
| WO | WO-2005/028369 A1 | 3/2005 | |
| WO | WO-2010/032052 A1 | 3/2010 | |
| WO | WO-2013/040694 A1 | 3/2013 | |
| WO | 2016/139461 | * 9/2016 | |

OTHER PUBLICATIONS

International Search Report and Written Opinion of the ISA for PCT/GB2016/05030, ISA/EP, Rijswijk, NL, dated Aug. 11, 2016.
Lasheen et al: "Soda ash roasting of titania slag product from Rosetta ilmenite", Hydrometallurgy, Elsevier Scientific Publishing CY. Amsterdam, NL, vol. 93, No. 3-4, Aug. 1, 2008 (Aug. 1, 2008), pp. 124-128, XP022757950, ISSN: 0304-386X, DOI: 10.1016/J.HYDROMET.2008.02.020 [retrieved on Mar. 31, 2008].
Mudzanapabwe et al. "In situ carbothermic reduction of a ferro-columbite concentrate in the recovery of Nb and Ta as metal matrix composite from tin smelting slag waste dump", Materials and Design, vol. 25, 2004, pp. 297-302.
Wang et al. "Leaching of niobium and tantalum from a low-grade ore using a KOH roast-water leach system", Hydrometallurgy, vol. 98, 2009, pp. 219-223.
Zhao et al. "A novel method to extract iron, titanium, vanadium, and chromium from high-chromium vanadium-bearing titanomagnetite concentrates", Hydrometallurgy, vol. 149, 2014, pp. 106-109.
United Kingdom Search Report for Application No. GB1503635.3 dated Oct. 22, 2015.

* cited by examiner

*Primary Examiner* — Steven J Bos
(74) *Attorney, Agent, or Firm* — Harness, Dickey & Pierce, P.L.C.

(57) ABSTRACT

A process for recovering metal value-containing precipitates in consistently high concentrations from a metal-containing composition by combining selective roasting and leaching steps.

19 Claims, 13 Drawing Sheets

PROCESS FOR RECOVERING PRIMARY METAL RESIDUE FROM A METAL-CONTAINING COMPOSITION

CROSS-REFERENCE TO RELATED APPLICATIONS

This application is a 371 U.S. National Stage of International Application No. PCT/GB2016/050530, filed Mar. 1, 2016, which claims the benefit of and priority to British Patent Application No. GB 1503635.3, filed Mar. 4, 2015. The entire disclosures of the above applications are incorporated herein by reference.

The present invention relates to a process for recovering a primary metal residue from a metal-containing composition.

Naturally-occurring reactive metal oxides of titanium, chromium and aluminium commonly combine chemically with transition metal oxides such as ferrous, ferric, vanadium, niobium and tantalum oxides and rare earth oxides to form complex geological minerals. Similar and dissimilar ionic substitutions lead to complex multi-phase systems including (for example) solid solutions and highly complex crystal structures. The recovery of metal oxides by physicochemical separation is therefore challenging. Similar challenges arise in recovering metal oxides from perovskite-type deposits which are rich in MgO and CaO. Moreover current industrial processes for recovering metal oxides are energy intensive and produce sulphate and neutralized chloride waste from titanium dioxide enrichment, red mud from bauxite refining and slag and leach residues from vanadium. Thus there is a constant demand for improvements in efficiency, whilst economic, environmental, safety and energy considerations are paramount.

Titanium dioxide ($TiO_2$) is an inorganic compound commonly used in the pigment, ink and paper industries because of its excellent optical properties and inertness. High grade $TiO_2$ is extracted via chloride, sulphate and Becher processes. The disadvantage of these processes is that iron is not recovered and is therefore taken into the waste stream. Due to the loss of iron, the chloride, sulphate and Becher processes may not be economical for treating low grade $TiO_2$ and high grade Fe materials since a large proportion of waste would be generated per ton of $TiO_2$. Furthermore the nature of impurities in the feedstock may be a hindrance. For example, CaO and MgO form low melting point compounds of $CaCl_2$ and $MgCl_2$ respectively in the chloride process whereas $SiO_2$ and $Al_2O_3$ are insoluble in acid and therefore decrease the quality of $TiO_2$ in the Becher process.

In a reductive smelting process, the amount of waste is minimised as iron is recovered in the form of steel. However $TiO_2$ reacts with $SiO_2$, $Al_2O_3$ and part of FeO to form complex molten slag. The recovery of $TiO_2$ from slag requires many steps and the $TiO_2$ grade is <85 wt %. Moreover valuable components such as $V_2O_5$ or $Al_2O_3$ may not be easily recovered due to the complex slag. In summary, there is no established process for recovering Fe, $TiO_2$, $Al_2O_3$ and $V_2O_5$ from high grade $Fe_2O_3$ or $Fe_3O_4$ and low grade $TiO_2$ feedstock. The recovery of these constituents is essential to minimise the amount of waste.

Processes for the recovery of $Ta_2O_5$ and $Nb_2O_5$ from columbite and tantalite concentrates are based on oxidative fusion with alkali salts followed by leaching of the fused mass with water and hydrochloric acid. Recovery of alkali is impossible and the production of by-products with low market value has led to the commercial failure of these processes. Other processes have involved the hydrothermal leaching of low grade tantalite and columbite concentrates with concentrated potassium hydroxide. The reduction of tantalite and columbite concentrates to produce TaC and NbC occluded inside of an iron matrix has been studied but not for the purposes of selective separation. Selective separation of TaC and NbC from the metallic matrix is extremely difficult due to their fine size and low surface energy. $Ta_2O_5$ and $Nb_2O_5$ generally coexist with tin oxide which is a useful metal value.

Current industrial processes involve the total dissolution of niobium and tantalum concentrates in hydrofluoric acid. Gangue minerals generate solutions with large amounts of impurities which hamper the separation of high purity niobium and tantalum compounds. The consumption of 70% HF is typically 1.2 to 2.5 ton per ton of concentrate to which a large contribution is evaporation losses during mineral dissolution at 250° C. The prohibitively high recovery costs, equipment maintenance, dangerous operation and health risks are additional drawbacks of this technology.

The present invention seeks to provide an improved process for recovering a primary metal residue (eg oxide) from a metal-containing composition in a high concentration. In particular, the process permits the recovery of metal value-containing precipitates in consistently high concentrations which reduces the levels of waste and usage of raw materials.

Thus viewed from a first aspect the present invention provides a process for recovering a primary metal residue from a metal-containing composition comprising:
 (a) preparing a feedstock of the metal-containing composition and an alkali salt;
 (b) reductively or oxidatively roasting the feedstock at a roasting temperature for a roasting period to produce a roast;
 (c) cooling the roast to produce a roasted mass containing metallic iron or an alloy or compound thereof and soluble metal oxides;
 (d) adding an aqueous medium to the roasted mass to form a substantially insoluble product and a first solution of soluble metal oxides;
 (e) acid leaching the substantially insoluble product or a fraction thereof to produce a leach residue and a second solution of soluble metal oxides;
 (f) roasting the leach residue in the presence of a bisulphate or bicarbonate of an alkali metal or alkaline earth metal to produce a roasted residue; and
 (g) hydrometallurgically extracting from the roasted residue the primary metal residue and a third solution of soluble metal oxides.

The presence of a bisulphate or bicarbonate of an alkali metal or alkaline earth metal assisted by any residual iron advantageously promotes the formation of soluble metal compounds (eg double salts and sulphates) which can be extracted in step (g) into the third solution of soluble metal oxides.

Step (a) is typically carried out by mixing (eg homogeneously mixing) the metal-containing composition with the alkali salt to produce the feedstock.

The metal-containing composition may be present in the feedstock in an amount in excess of 40 wt %.

The alkali salt may be present in the feedstock in an amount in excess of 20 wt %.

The alkali salt may be an alkali metal salt or alkaline earth metal salt. The alkali salt is typically decomposable at less than 900° C., preferably less than 800° C., particularly preferably less than 750° C. The alkali salt may be an alkali metal halide, carbonate, bicarbonate, hydrogen sulphide, hydrogen sulphate, nitrate, chlorate, perchlorate or sulphate. Preferably the alkali salt is a carbonate, hydroxide, bicarbonate or sulphate of a group IA or group IIA metal or a mixture thereof. For example, the alkali salt may be selected from the group consisting of $Na_2CO_3$, $K_2CO_3$, $Na_2SO_4$, $K_2SO_4$, NaOH, $NaHSO_4$, $KHSO_4$, $KHCO_3$, $NaHCO_3$ and KOH.

The weight ratio of metal-containing composition: alkali salt is typically in the range 1:0.1 to 1:2.

In step (a), the feedstock may be ground to a mean particle diameter of 106 microns or less, preferably 90 microns or less.

Step (b) may be carried out oxidatively in air or an exogenous source of oxygen.

Step (b) may be carried out reductively in the presence of carbon (eg charcoal, graphite, coal or coke) in a flow of an inert gas such as nitrogen or argon (eg at a flow rate of 1-10 l/min). Carbon may be present in an amount of 20 wt % or more. The weight ratio of metal-containing composition: carbon is typically in the range 1:0.01 to 1:0.5.

Step (b) may be carried out in a rotary furnace or static furnace (eg kiln). Step (b) may be carried out in a reductive atmosphere or air in a tubular or chamber kiln using a crucible.

The roasting temperature may be in the range 600° C. to 1500° C., preferably 800° C. to 1300° C., more preferably 875° C. to 1100° C. (eg about 900° C. for oxidative roasting and about 1050° C. for reductive roasting).

The roasting period may be in the range 0.1 to 4 hours.

In step (c), cooling may take place (for example) in a rotary cooling drum. The cooling period is typically in excess of 60 minutes.

In step (c), the roasted mass may be ground to a mean particle diameter of 106 microns or less, preferably 90 microns or less.

In step (d), the aqueous medium may be water or an alkali (eg dilute KOH, NaOH or $Na_2CO_3$). Preferably in step (d) the aqueous medium is water.

Step (d) may be accompanied by water leaching. Typically the aqueous medium is water at an elevated temperature. Step (d) may be carried out at an elevated temperature (eg 25 to 70° C.). Step (d) may be carried out over a period of 0.5 to 5 hours.

Step (d) may form a slurry.

Step (e) may be carried out at an elevated temperature (eg a temperature in the range 25-100° C.). Step (e) may be carried out for a period of 1 to 10 hours. Step (e) may be carried out in air or in a reducing agent (eg $H_2$) and/or an inert gas (eg Ar). Step (e) may be carried out at a pH of 4 or less.

The acid leachant may be an inorganic acid such as hydrofluoric acid, hydrochloric acid, nitric acid, sulphuric acid, an acidic oxide and mixtures thereof or a weak organic acid such as formic, oxalic, ascorbic, citric, lactic or acetic acid. Sulphuric acid is preferred. Ascorbic acid and oxalic acid are preferred. Sulphuric acid and oxalic acid are preferred.

In step (f), the temperature may be in the range 400° C. to 750° C. Step (f) may be carried out for a period of 0.1 to 4 hours. Step (f) may be carried out in air. The weight ratio of the bisulphate or bicarbonate to leach residue may be in the range 0.2:1 to 3:1.

Preferably the bisulphate or bicarbonate of an alkali metal or alkaline earth metal is a bisulphate.

Preferably the bisulphate or bicarbonate of an alkali metal or alkaline earth metal is a bisulphate or bicarbonate of an alkali metal, particularly preferably of Na.

The bisulphate or bicarbonate of an alkali metal or alkaline earth metal may be one or more of $NaHSO_4$, $KHSO_4$, $NaHCO_3$ or $KHCO_3$.

Preferably the bisulphate or bicarbonate of an alkali metal or alkaline earth metal is $NaHSO_4$.

The metal-containing composition may be synthetic or natural.

The metal-containing composition is typically a mixture of simple and/or complex metal oxides. The metal-containing composition may include one or more of the group consisting of $Al_2O_3$, $V_2O_5$, $TiO_2$, $Fe_2O_3$, FeO, $Fe_3O_4$, CaO, $Na_2O$, MgO, MnO, NiO, $SiO_2$, SnO, $SnO_2$ and ZnO.

The metal-containing composition may be a metal-containing by-product of an industrial process such as a metal-containing slag.

The metal-containing composition may be a mixture or solid solution of metals such as an alloy.

The metal-containing composition may be a mixture of metal compounds (eg oxides, sulphides and/or silicates) such as an ore, ore concentrate, mineral or mixture thereof.

An ore concentrate may be prepared from an ore by one or more physical (eg mechanical) processes such as crushing and gravitational, magnetic or electrical separation or by chemical processes such as leaching or high temperature reduction (eg slag formation).

Typically the metal-containing composition is iron-containing. The metal-containing composition may be iron-rich. For example, the metal-containing composition may have an amount of iron up to 75 wt %. The metal-containing composition may include Fe, FeO, $Fe_2O_3$ or $Fe_3O_4$. For example, the metal-containing composition may be titaniferrous or ferrotantalite or ferrocolumbite.

In the metal-containing composition, it is preferred that the amount of any alumina is minimal (eg 15 wt % or less).

In the metal-containing composition, it is preferred that the amount of any silica is minimal (eg 5 wt % or less).

Step (g) may include one or more steps of the group consisting of leaching, precipitation, separation (eg chemical separation or physical separation such as magnetic separation), thickening, evaporation, washing, drying and reduction. Each of these steps may be carried out at ambient or elevated temperature or pressure. For example, a leaching step may be carried out in a reaction vessel such as a stirred tanker reactor or a pressure vessel such as an autoclave.

Preferably step (g) comprises:

(g1) adding to the roasted residue an aqueous medium to produce the third solution of soluble metal oxides and the primary metal residue; and (g2) separating the primary metal residue from the third solution of soluble metal oxides.

The aqueous medium may be water or an alkali solution (eg a dilute solution of KOH, NaOH or $Na_2CO_3$). Typically water is used at an elevated temperature. The hot water may be at a temperature in the range 25 to 80° C. Step (g1) may be carried out in hot water for 20 to 300 minutes.

The process may further comprise recovering one or more metal value-containing precipitates. The one or more metal value-containing precipitates may contain oxides or hydroxides of Ca, Na, Mg, Ti, Mn, Al, Ni, Zn, Ca, Fe or V (eg $V_2O_5$, $TiO_2$, $Fe_2O_3$, FeO, CaO, $Na_2O$, $Al_2O_3$, MgO, MnO, NiO or ZnO) or hydrates thereof.

Preferably the process further comprises: recovering one or more metal value-containing precipitates from the first solution of soluble metal oxides. The one or more metal value-containing precipitates may contain V, Al or Na values.

Preferably the process further comprises: recovering one or more metal value-containing precipitates from the second solution of soluble metal oxides. The one or more metal value-containing precipitates may contain Al values.

Preferably the process further comprises: recovering one or more metal value-containing precipitates from the third solution of soluble metal oxides. The one or more metal value-containing precipitates may contain Na, Ti, Ca, Mn, Mg, Fe or V values.

The recovery of metal value-containing precipitates from a solution of soluble metal oxides may be carried out by basification. For example the recovery of metal value-containing precipitates may be carried out by the addition of an inorganic base (such as an inorganic base selected from the group consisting of potassium hydroxide, sodium hydroxide or sodium carbonate and mixtures thereof) or of a weak organic base.

The recovery of metal value-containing precipitates from a solution of soluble metal oxides may be carried out by acidification. For example the recovery of metal value-containing precipitates may be carried out by the addition of an inorganic acid such as an inorganic acid selected from the group consisting of hydrofluoric acid, hydrochloric acid, nitric acid, sulphuric acid, an acidic oxide and mixtures thereof or of a weak organic acid such as formic, oxalic, ascorbic, citric, lactic or acetic acid and/or $CO_2$ (eg by $CO_2$ bubbling).

Preferably the process further comprises:

(d1) separating (eg decanting) a rare earth oxides-containing colloidal solution from the surface of the first solution of soluble metal oxides.

The rare earth oxides-containing colloidal solution may be treated to recover individual rare earth oxides with important applications in low carbon technologies.

The amount of rare earth oxides in the rare earth oxides-containing colloidal solution may be in the range 5 to 30 wt %.

(A) In a first preferred embodiment, the metal-containing composition is titanium rich. Typically the titanium-containing composition has an amount of titanium dioxide up to 40 wt %.

Preferably the metal-containing composition is a titanium ore concentrate (eg a concentrate of ilmenite, anatase, perovskite or rutile).

Preferably the primary metal residue is titanium (IV) oxide ($TiO_2$) (eg rutile and/or anatase).

The presence of a bisulphate or bicarbonate of an alkali metal or alkaline earth metal advantageously promotes the formation of soluble metal compounds (such as double salts and sulphates) at the expense of insoluble calcium titanate which is otherwise a significant contaminant of the primary metal residue.

In the first preferred embodiment, $TiO_2$ may be present in the primary metal residue in a concentration in excess of 85 wt % (eg in the range 85 to 95 wt %).

Particularly preferably the process further comprises: recovering one or more vanadium values (eg V, $V_2O_5$ or $VO_2$) from the first solution of soluble metal oxides. The one or more vanadium values may be recovered in a concentration in the range 1 to 10 wt %.

Particularly preferably the process further comprises: recovering one or more sodium values (eg $Na_2CO_3$) from the first solution of soluble metal oxides. The one or more sodium values may be recovered in a concentration in excess of 90 wt %.

Particularly preferably the process further comprises: recovering one or more sodium values (eg $Na_2SO_4$ or $HNa_3(SO_4)_2$) from the third solution of soluble metal oxides. The one or more sodium values may be recovered in a concentration in excess of 90 wt %.

Particularly preferably the process further comprises: recovering one or more titanium values (eg $TiO_2$) from the third solution of soluble metal oxides.

Particularly preferably the process further comprises: recovering one or more iron values (eg $Fe_2O_3$) from the third solution of soluble metal oxides.

Particularly preferably the process further comprises: recovering one or more vanadium values (eg $V_2O_5$) from the third solution of soluble metal oxides.

Particularly preferably the process further comprises: recovering one or more calcium values (eg $CaSO_4$) from the third solution of soluble metal oxides.

In the first preferred embodiment, step (e) serves primarily to remove Si and Al residues (eg oxides) which may be recovered from the second solution. Step (e) is typically carried out in the presence of sulphuric acid.

In the first preferred embodiment, step (g) serves primarily to remove CaO.

(B) In a second preferred embodiment, the metal-containing composition is niobium and/or tantalum rich. Typically the niobium and/or tantalum-containing composition has a combined amount of niobium and tantalum oxide in excess of 15 wt % (eg in the range 18 to 90 wt %). The amount of niobium oxide may be in the range 14 to 51 wt %. The amount of tantalum oxide may be in the range 4 to 39%.

Preferably the metal-containing composition is columbite, tantalite or [(Fe, Mn)(Nb, Ta)$_2O_6$].

Preferably the primary metal residue may be niobium (V) oxide and/or tantalum (V) oxide.

The presence of a bisulphate or bicarbonate of an alkali metal or alkaline earth metal advantageously promotes the formation of soluble metal compounds (such as $Na_2Mg(SO_4)_2$ and $Na_2Ca(SO_4)_2$) at the expense of insoluble calcium and magnesium compounds which would otherwise contaminate the primary metal residue.

In the second preferred embodiment, $Nb_2O_5$ and $Ta_2O_5$ may be present in the primary metal residue in a concentration in the range 79 to 90 wt %.

In the second preferred embodiment, step (b) may be reductively roasting the feedstock at a roasting temperature for a roasting period to produce a roast. This leads advantageously to the formation of Fe—Sn alloy.

In the second preferred embodiment, step (b) may be oxidatively roasting the feedstock at a roasting temperature for a roasting period to produce a roast. This leads advantageously to the formation of $SnO_2$.

Particularly preferably the process further comprises: recovering one or more aluminium values (eg $Al_2O_3$) from the first solution of soluble metal oxides. The one or more aluminium values may be recovered in a concentration in the range 75 to 80 wt %.

Particularly preferably the process further comprises: recovering one or more sodium values (eg $Na_2CO_3$) from the first solution of soluble metal oxides. The one or more sodium values may be recovered in a concentration in the range 85 to 90 wt %.

Particularly preferably the process further comprises: recovering one or more tin values (eg $SnO_2$) from the first solution of soluble metal oxides.

Particularly preferably the process further comprises: recovering one or more metal value-containing precipitates from the second solution of soluble metal oxides. The one or more metal value-containing precipitates may contain Na, Mn, Sn and Fe values.

Particularly preferably the process further comprises: recovering one or more metal value-containing precipitates from the third solution of soluble metal oxides. The one or more metal value-containing precipitates may be Na, Ca, Mn, Mg and Fe values.

In the second preferred embodiment, step (e) serves primarily to remove Na, Fe, Mn and Sn. Step (e) is typically carried out in the presence of an organic acid (eg formic, oxalic, ascorbic, citric, lactic or acetic acid). Preferred is ascorbic and oxalic acid. The concentration of ascorbic acid may be in the range 0.5-5 g/L. The concentration of oxalic acid may be in the range 1.0-13.0 g/L. Step (e) may be carried out at an elevated temperature (eg 25 to 100° C.). Step (e) may be carried out in a reductive atmosphere (eg a mixture of $H_2$ and Ar). Step (e) may be carried out for 1 to 10 hours.

(1) In a first preferred embodiment, step (b) is: reductively roasting the feedstock at a roasting temperature for a roasting period to produce a roast.

In the first preferred embodiment, the process preferably further comprises:

(d2) magnetically separating from the substantially insoluble product a magnetic fraction and a substantially non-magnetic fraction, wherein step (e) is: acid leaching the substantially non-magnetic fraction to produce a leach residue and a second solution of soluble metal oxides.

The iron is predominantly present in the magnetic fraction as metallic iron or an alloy thereof and may be advantageously recovered.

Step (d2) is typically carried out by wet magnetic separation.

The efficiency of step (d2) may be dependent on the particle size of the metallic iron. If iron particles are insufficiently large, they might fail to cluster and separate from other particles which decreases the efficiency of the separation. Thus controlling the particle size of metallic iron by grinding serves to optimise efficiency.

In the first preferred embodiment, the process preferably further comprises:

(a1) grinding the feedstock.

In the first preferred embodiment, the process preferably further comprises:

(c1) grinding the roasted mass.

In the first preferred embodiment, step (d) typically forms a slurry.

Particularly preferably the process further comprises:

(d2a) water leaching the substantially non-magnetic fraction to produce an alkaline solution. The alkaline solution is advantageously added to the first solution.

Particularly preferably the process further comprises:

(d3) smelting the magnetic fraction to produce a steel residue and a non-magnetic slag.

Step (d3) may be carried out in the presence of about 1 wt % carbon. Step (d3) may be carried out for 1 to 3 hours. Step (d3) may be carried out in a flow of an inert gas (eg argon). Step (d3) may be carried out at a temperature in excess of 1400° C.

The steel residue may be recovered with a concentration of iron of 95 wt % or more.

More preferably the process further comprises:

(d3a) acid leaching the non-magnetic slag to produce a slag leach residue and a fourth solution of soluble metal oxides;

(d3b) roasting the slag leach residue in the presence of a bisulphate or bicarbonate of an alkali metal or alkaline earth metal to produce a roasted slag leach residue; and (d3c) hydrometallurgically extracting from the roasted slag leach residue a secondary metal residue and a fifth solution of soluble metal oxides.

Step (d3a) may be carried out at an elevated temperature (eg a temperature in the range 25-100° C.). Step (d3a) may be carried out for a period of 1 to 10 hours. Step (d3a) may be carried out in air. The acid leachant may be an inorganic acid such as hydrofluoric acid, hydrochloric acid, nitric acid, sulphuric acid, an acidic oxide and mixtures thereof or a weak organic acid such as formic, oxalic, ascorbic, citric, lactic or acetic acid. Sulphuric acid is preferred.

In step (d3b), the temperature may be in the range 600° C. to 750° C. Step (d3b) may be carried out for a period of 1 to 2 hours. Step (d3b) may be carried out in air. The weight ratio of the bisulphate or bicarbonate to slag leach residue may be in the range 0.2:1 to 3:1.

Step (d3c) may be carried out in a similar manner to step (g).

The recovery of secondary metal residue may be 85 wt % or more. The secondary metal residue is typically the same as the first metal residue.

Even more preferably the process further comprises:

recovering one or more metal value-containing precipitates from the fifth solution of soluble metal oxides. The one or more metal value-containing precipitates may contain Na, Ti, Ca, Fe or V values.

In the first embodiment, the process may further comprise:

(e1) heating the leach residue to remove carbon.

Step (e1) may be carried out at a temperature in the range 900 to 1000° C. Step (e1) may be carried out for 1 to 2 hours.

(2) In a second preferred embodiment, step (b) is: oxidatively roasting the feedstock at a roasting temperature for a roasting period to produce a roast, wherein step (e) is: acid leaching the substantially insoluble product to produce a leach residue and a second solution of soluble metal oxides.

In the second preferred embodiment, step (d) is typically accompanied by leaching.

The iron is predominantly present in the second solution and may be advantageously recovered in a metal value-containing precipitate.

The present invention will now be described in a non-limitative sense with reference to the accompanying Figures in which.

EXAMPLE 1

Figure 1A:
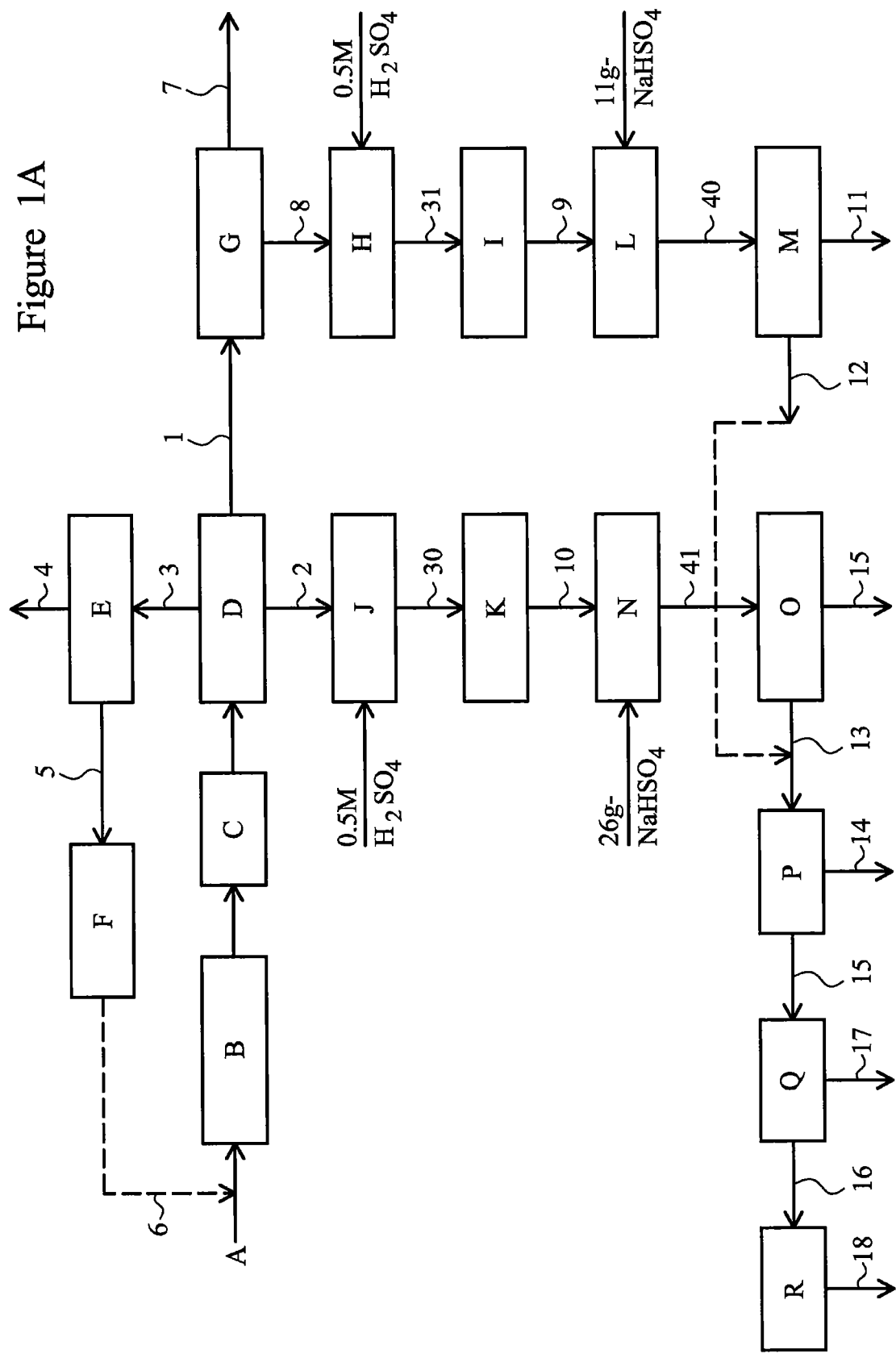
FIG. 1A illustrates a first embodiment of the process of the invention.

A first embodiment of the process of the invention is illustrated in FIG. 1A. Metal oxides were recovered from a mineral waste which was the product of the extraction of vanadium from a South African mineral ore. The composition of the mineral waste is given in Table 1.

TABLE 1

XRF analysis of the as-received mineral sample

| | $Fe_2O_3$ | $TiO_2$ | $SO_3$ | $Na_2O$ | $Al_2O_3$ | $SiO_2$ | MnO | CaO | MgO | $V_2O_5$ |
|---|---|---|---|---|---|---|---|---|---|---|
| Wt % | 66.5 | 11.7 | 2.1 | 5.6 | 5.0 | 5.8 | 0.3 | 1.6 | 0.4 | 0.3 |

The process in this first embodiment involved two main stages. Stage 1 involved concentration and stage 2 involved removal of impurities. The reactions involved in the first embodiment are shown below. The material and steps involved in each stage were as follows:

Stage 1—Concentration

A. The as-received mineral waste was ground into particles with a dimension less than 106 μm. 250 g of the ground mineral waste was mixed with sodium carbonate (50 g) and activated charcoal or coal (72.5 g) to produce a feedstock.

B. The feedstock was transferred into an alumina crucible and heated inside a resistance furnace under an inert (nitrogen or argon) atmosphere at 1050° C. for 90 minutes to produce a roast. Carbon produces three parts of carbon monoxide gas which has a large calorific value as a fuel.

C. The roast was cooled to a roasted mass and ground into particles with a dimension less than 106 μm. The roasted mass was characterised by XRD, SEM and XRF. The main phases identified by XRD (see FIG. 12) were metallic iron and $Na_2TiO_3$ formed by reactions 1 and 2. The secondary constituents were $NaAlSiO_4$ and $CaTiO_3$.

Figure 12:
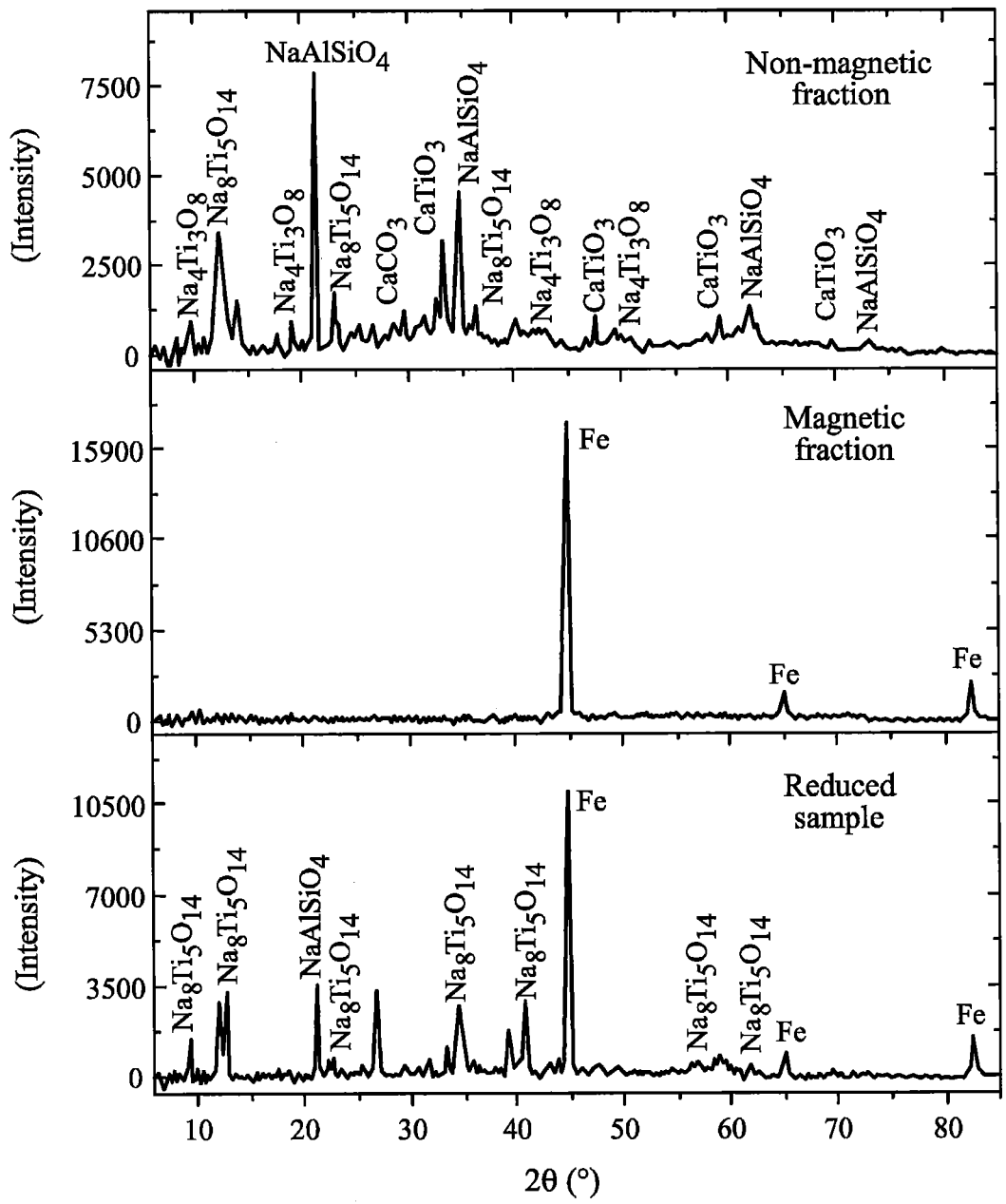
FIG. 12 illustrates XRD patterns of (a) the roasted mass, (b) magnetic fraction and (c) non-magnetic fraction from the first embodiment of the invention.
Figure 13:
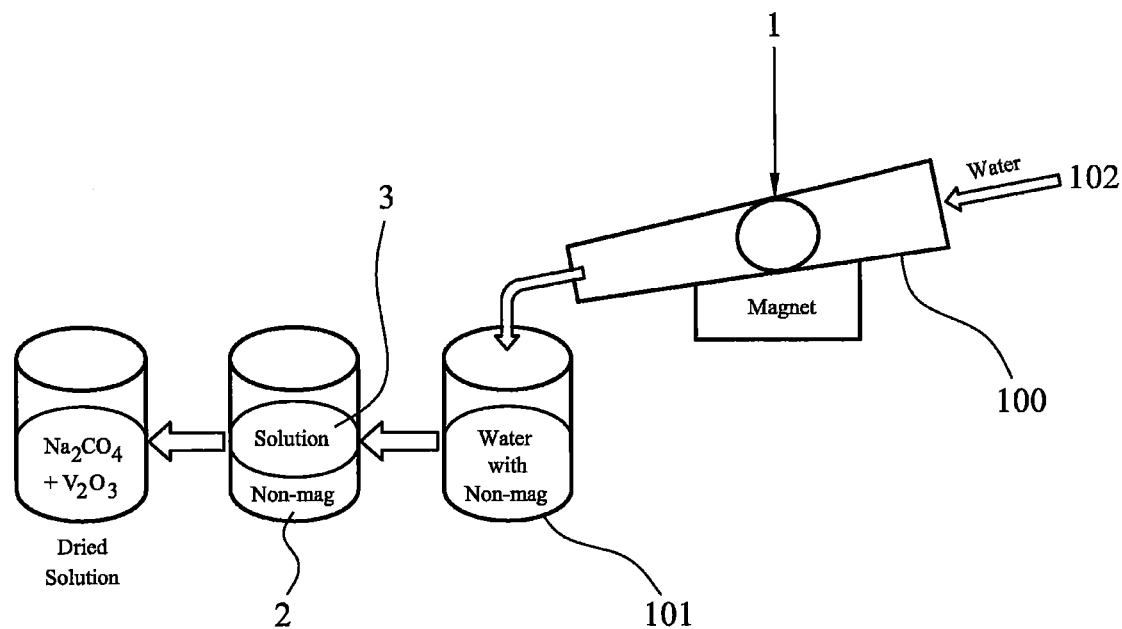
FIG. 13 illustrates schematically the cold water stream assisted magnetic separation carried out in step D of the first embodiment of the invention.
Figure 14:
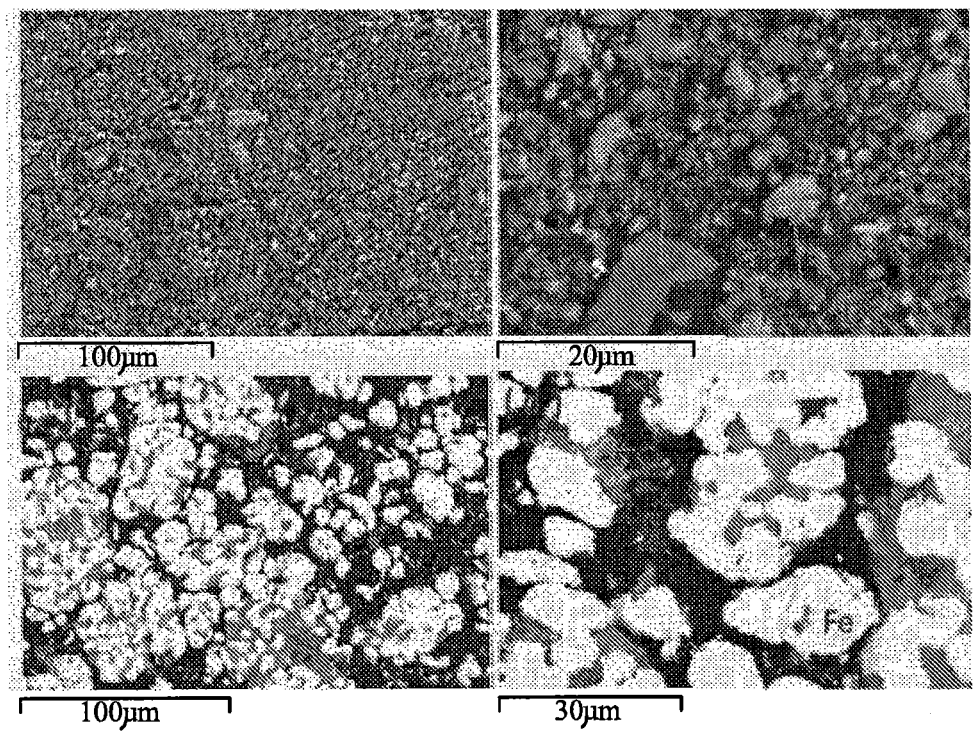
FIG. 14 illustrate backscattered SEM images of the non-magnetic fraction (see (a) and (b)) and the magnetic fraction (see (c) and (d)) from step D of the first embodiment of the invention.

D. The ground roasted mass (233 g) was then fed onto a magnetic trough (100 in FIG. 13) for wet magnetic separation. The ground roasted mass was gently poured with a flow of cold water 102 from a nearby tap to wash-off non-magnetic components and dissolve water-soluble components such as $NaAlO_2$ and $NaVO_3$. The ground roasted mass on the magnetic separator was scrubbed with a brush to aid separation and a non-magnetic fraction 2 (48 g) suspended in a first solution 3 was collected in a beaker 101 for detailed chemical, physical and microstructural analyses. A magnetic fraction 1 (145g) was retained in the magnetic trough 100. The non-magnetic fraction 2 was allowed to settle and the first solution 3 was decanted. The XRD patterns for the magnetic fraction 1 and non-magnetic fraction 2 are shown in FIG. 12. The non-magnetic fraction 2 included $CaCO_3$, $Na_2TiO_3$, $CaTiO_3$ and $NaAlSiO_4$. Fe was mainly recovered in the magnetic fraction 1. $Na_2TiO_3$ is less crystalline in the non-magnetic fraction 2 due to dissolution of a part of the sodium. XRF analysis for the magnetic fraction 1 and non-magnetic fraction 2 are shown in Table 2 and it is evident that the Fe content in the magnetic fraction 1 was very high (88 wt %). The magnetic fraction 1 contains 2.1 wt % alkali due to the presence of residual sodium titanate. By comparing the $TiO_2$ content in the non-magnetic fraction 2 (Table 2) and the as-received sample (Table 1), it is evident that the concentration of $TiO_2$ has increased threefold after steps B, C and D. FIG. 14 illustrates backscattered SEM images of the non-magnetic fraction 2 (see (a) and (b)) and the magnetic fraction 1 (see (c) and (d)).

Figure 10:
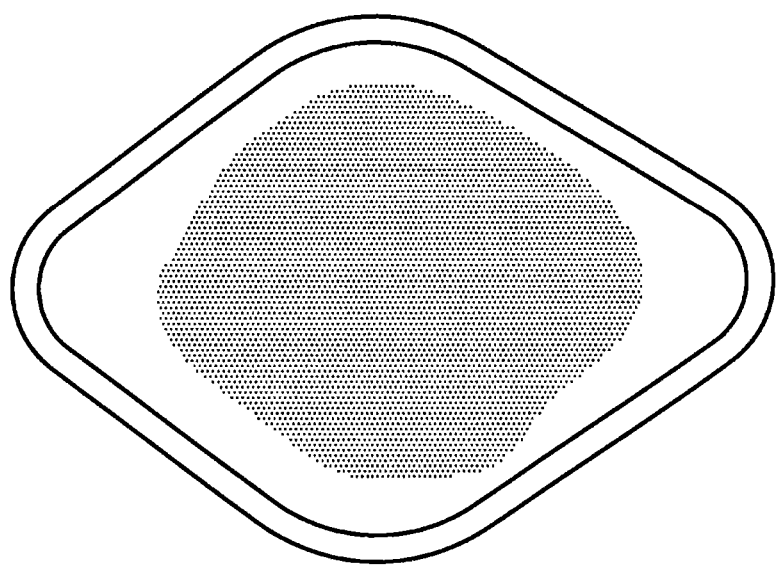
FIG. 10 illustrates $Al_2O_3$-$V_2O_5$ precipitates obtained after step E of the first embodiment of the invention.
Figure 11:
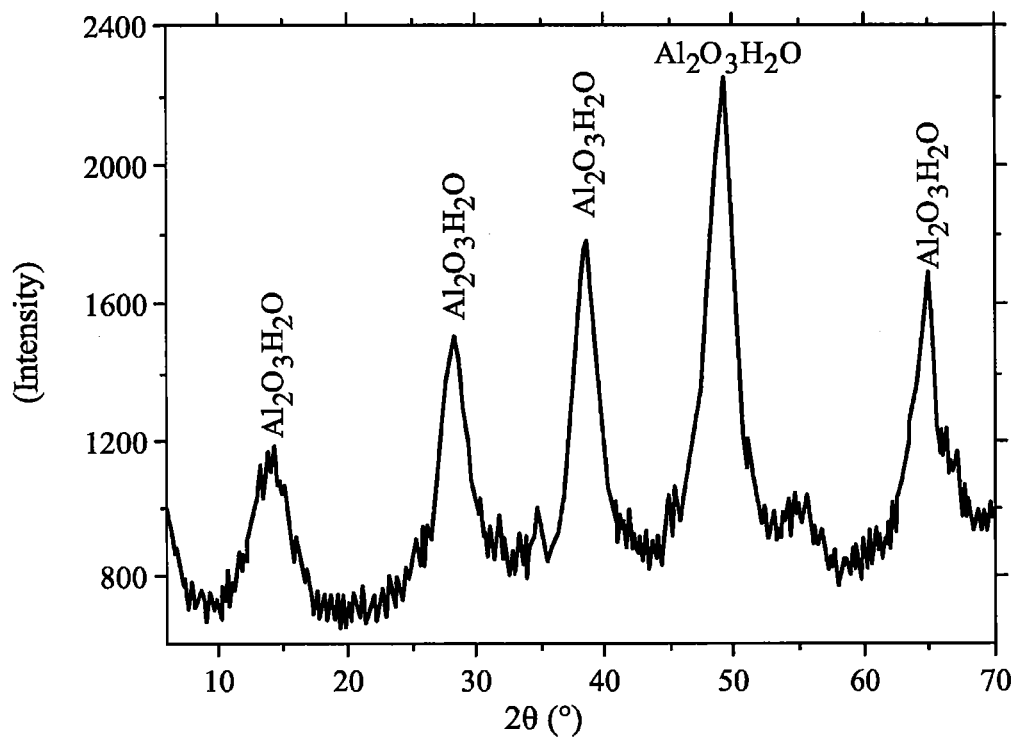
FIG. 11 illustrates the XRD pattern for the $Al_2O_3V_2O_5$ precipitates obtained after step E of the first embodiment of the invention.

E. A first metal value-containing precipitate 4 (2.4 g) was recovered from the first solution 3 by $CO_2$ gas bubbling for 30 minutes at 80° C. A digital image, XRD and XRF results for the first metal value-containing precipitate 4 are shown in FIGS. 10 and 11 and Table 7 respectively.

F. A fourth solution 5 separated after step E was subjected to evaporation to produce a second metal value-containing precipitate 6 (21 g) which contained 94 wt % $Na_2CO_3$ and 0.6 wt % $V_1O_5$ (see Table 8). The second metal value-containing precipitate 6 was recycled into step B.

G. The magnetic fraction 1 from step D was thoroughly mixed with 1 wt % carbon and transferred to an alumina crucible where it was smelted for 2 hours under a flow of argon gas (3 litres/min) at 1470° C. This led to the recovery of a steel residue 7 (125g) and a non-magnetic slag 8 (16.2 g). XRF analyses of the steel residue 7 and non-magnetic slag 8 are given in Table 5.

H. The non-magnetic slag 8 was treated with 0.5M $H_2SO_4$ and heated at 40° C. for 3 hours to produce a slag leach residue 31.

I. The slag leach residue 31 was heated at 800° C. for 90 minutes to burn off excess carbon and produce a slag 9 (11.2g). XRF analysis of the slag 9 is shown in Table 6. The slag 9 may be subjected to magnetic separation of any residual iron (in a manner analogous to step D) or fed back into the feedstock in step A for the same purpose.

Figure 15:
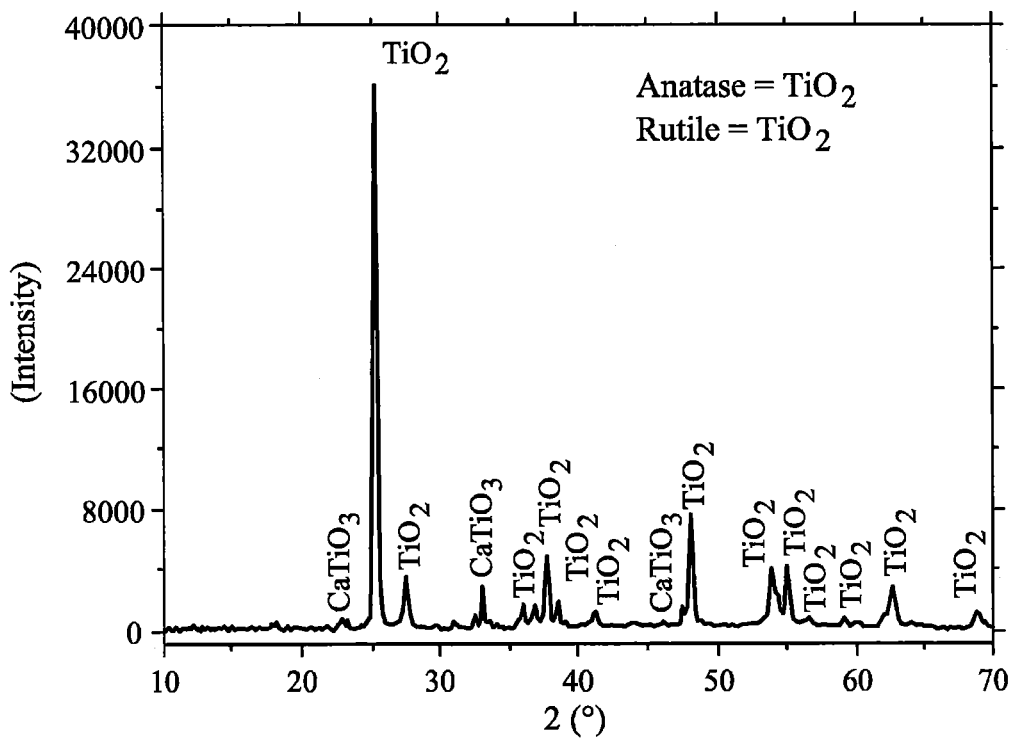
FIG. 15 illustrates the XRD pattern of the leach residue 30 from step J of the first embodiment of the invention.

J. The non-magnetic fraction 2 was treated with 0.5M $H_2SO_4$ and heated under normal atmosphere at 40° C. for 2 hours to produce a leach residue 30 and a second solution. The XRD pattern for the leach residue 30 is given in FIG. 15 and it is evident that CaO is present in the form of acid insoluble $CaTiO_3$.

K. The leach residue 30 was heated at 800° C. for 90 minutes to burn off excess carbon and produce a solid residue 10 (24.5 g). XRF analysis of the solid residue 10 is shown in Table 3 from which it is evident that most of the MnO, MgO, $SiO_2$ and $Al_2O_3$ constituents were removed into the second solution whereas CaO was only partially removed.

The proportion of TiO$_2$ has more than doubled due to dissolution of NaAlSiO$_4$, CaCO$_3$ and metallic Fe and Na from Na$_2$TiO$_3$.

Stage 2—Removal of Impurities

L. 11 g of NaHSO$_4$ was added to slag 9 which was then roasted for 60 minutes at 650° C. to produce a roasted slag 40.

M. The roasted slag 40 was leached with hot water to produce a secondary metal residue 11 (7.2 g). XRF analysis of the secondary metal residue 11 is shown in Table 6.

N. 26 g of NaHSO$_4$ was added to the solid residue 10 which was then roasted for 60 minutes at 650° C. to produce a roasted residue 41. Reactions 5 to 7 are the major reactions.

Figure 9:
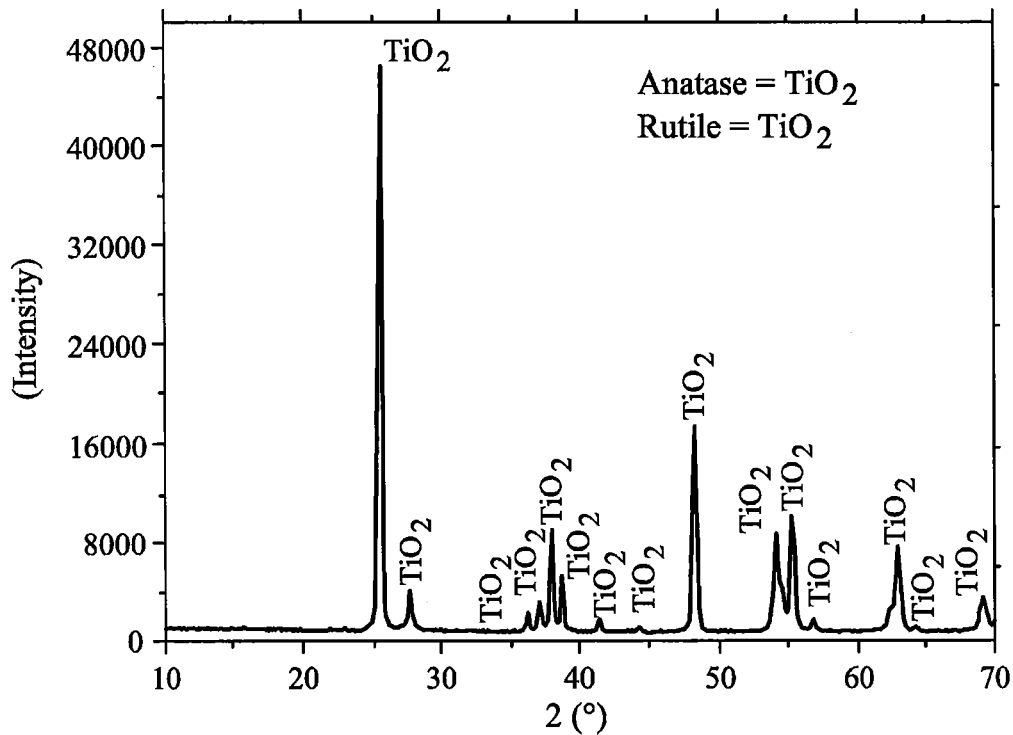
FIG. 9 illustrates XRD patterns of the washed solid residue from step O of the first embodiment of the invention.

O. The roasted residue 41 was leached for 45 minutes with hot water at 70° C. to produce a primary metal residue 15 (16.5g) and a third solution 13 which contained water soluble compounds (CaSO$_4$, Na$_2$SO$_4$ and FeSO$_4$) and about 5 wt % TiO$_2$. Although CaSO$_4$ is insoluble in water, it was found that dissolution was caused by the presence of FeSO$_4$ and Na$_2$SO$_4$. The primary metal residue 15 was washed in 0.2M HCl to remove Na$_3$Fe(SO$_3$)$_3$ which was found to be slightly soluble in water. XRF analysis of the washed primary metal residue 15 is presented in Table 4 from which it is evident that the metal sulphates had dissolved during leaching and washing. From the XRD pattern shown in FIG. 9, it can be observed that highly crystalline TiO$_2$ was obtained in the form of anatase and rutile with the major impurity being SiO$_2$.

P. A third metal value-containing precipitate 14 (2.9g) was recovered from the third solution 13 by CO$_2$ gas bubbling for 20 minutes at 80° C. XRF analysis of the third metal value-containing precipitate 14 is shown in Table 9.

Q. A fourth solution 15 separated after step P was heated at 90° C. and after about 60 minutes yielded a fourth metal value-containing precipitate 17 (2.1 g). XRF analysis of the fourth metal value-containing precipitate 17 is shown in Table 9.

R. A fifth solution 16 separated after step Q was subjected to evaporation and drying to yield a fifth metal value-containing precipitate 18 (29.8 g). XRF analysis of the fifth metal value-containing precipitate 18 is shown in Table 9. XRD analysis showed a phase of sodium hydrogen carbonate Na$_2$SO$_4$NaHSO$_4$(HNa$_3$(SO$_4$)$_2$).

Reactions $$FeTiO_3 + Na_2CO_3 + 2C = Na_2TiO_3 + Fe + 3CO(g) \quad\quad 1$$

$$Fe_2O_3 + 3C = 2Fe + 3CO(g) \quad\quad 2$$

$$Al_2O_3 + Na_2CO_3 + C = 2NaAlO_2 + 2CO \quad\quad 3$$

$$V_2O_5 + Na_2CO_3 + C = 2NaVO_3 + 2CO \quad\quad 4$$

$$CaTiO_3 + 2NaHSO_4 = CaSO_4 + Na_2SO_4 + TiO_2 + H_2O \quad\quad 5$$

$$NaFeTiO_3 + 2NaHSO_4 = CaSO_4 + Na_2SO_4 + FeSO_4 + TiO_2 + H_2O \quad\quad 6$$

$$Fe_2(SO_4)_3 3Na_2SO_4 = 2Na_3Fe(SO_4)_3 \quad\quad 7$$

TABLE 2

XRF analysis of the magnetic fraction 1 and the non-magnetic fraction 2

|   | Fe | TiO$_2$ | Na$_2$O | CaO | Al$_2$O$_3$ | SiO$_2$ | MgO | MnO | V$_2$O$_5$ |
|---|---|---|---|---|---|---|---|---|---|
| 1 | 88.3 | 5.4 | 2.1 | 0.6 | 1.3 | 1.2 | 0.4 | 0.1 | 0.05 |
| 2 | 4.5 | 34.1 | 27.1 | 3.3 | 12.7 | 13.3 | 3.3 | 0.6 | 0.6 |

TABLE 3

XRF analysis of the solid residue 10 from step K

|   | TiO$_2$ | Al$_2$O$_3$ | Na$_2$O | SO$_3$ | MgO | SiO$_2$ | Fe$_2$O$_3$ | CaO | MnO | Cr$_2$O$_3$ | V$_2$O$_5$ |
|---|---|---|---|---|---|---|---|---|---|---|---|
| Wt % | 77.2 | 0.7 | 4.8 | 2.7 | 0.5 | 2.5 | 6.1 | 3.6 | 0.1 | 0.4 | 0.9 |

TABLE 4

XRF analysis of the washed primary metal residue 15 from step O

|   | TiO$_2$ | Al$_2$O$_3$ | Na$_2$O | SO$_3$ | SiO$_2$ | Fe$_2$O$_3$ | CaO | Cr$_2$O$_3$ | V$_2$O$_5$ |
|---|---|---|---|---|---|---|---|---|---|
| Wt % | 94.0 | 0.3 | 0.3 | 0.7 | 2.8 | 0.6 | 0.2 | 0.1 | 0.8 |

TABLE 5

XRF analysis of the steel residue 7 and non-magnetic slag 8 from step G

Steel Residue 7

| Element | Fe | C | V | Al | Mn | Ni | Si | S | Ti | K |
|---|---|---|---|---|---|---|---|---|---|---|
| Wt % | 98.0 | 0.8 | 0.1 | 0.07 | 0.07 | 0.07 | 0.05 | 0.03 | 0.02 | 0.02 |

Slag 8

|   | TiO$_2$ | Fe$_2$O$_3$ | Na$_2$O | CaO | SiO$_2$ | Al$_2$O$_3$ | Cr$_2$O$_3$ | V$_2$O$_5$ | MgO | SO$_3$ | MnO |
|---|---|---|---|---|---|---|---|---|---|---|---|
| Wt % | 38.3 | 1.0 | 18.0 | 5.6 | 9.1 | 24.7 | 0.1 | 0.1 | 2.1 | 0.4 | 0.5 |

TABLE 6

XRF analysis of the slag 9 from step I and the secondary metal residue 11 from step M

|  | $TiO_2$ | $Al_2O_3$ | $Na_2O$ | $SO_3$ | MgO | $SiO_2$ | $Fe_2O_3$ | CaO | MnO | $Cr_2O_3$ |
|---|---|---|---|---|---|---|---|---|---|---|
| Slag | 66.7 | 11.9 | 6.4 | 0.4 | 3.6 | 0.7 | 1.2 | 7.9 | 0.7 | 0.1 |
| Secondary metal residue | 85.5 | 4.2 | 3.1 | 1.8 | 1.4 | 1.2 | 1.2 | 0.8 | 0.3 | 0.1 |

TABLE 7

XRF analysis of the first metal value-containing precipitate 4 from step E

|  | Fe | $TiO_2$ | $Na_2O$ | $SO_3$ | $SiO_2$ | $Al_2O_3$ | CaO | $V_2O_5$ | $Cr_2O_3$ |
|---|---|---|---|---|---|---|---|---|---|
| Wt % | 0.9 | 1.2 | 12.3 | 2.3 | 2.6 | 76.9 | 0.8 | 2.4 | 0.1 |

TABLE 8

XRF analysis of the second metal value-containing precipitate 6 from step F

|  | $TiO_2$ | $Al_2O_3$ | $Na_2O$ | $SO_3$ | MgO | $SiO_2$ | $Fe_2O_3$ | $Cr_2O_3$ | $V_2O_5$ |
|---|---|---|---|---|---|---|---|---|---|
| Wt % | 0.0 | 0.2 | 93.7 | 4.5 |  | 0.1 | 0.0 | 0.01 | 0.6 |

TABLE 9

XRF analysis of the third metal value-containing precipitate 14, fourth metal value-containing precipitate 17 and fifth metal value-containing precipitate 18 from steps P, Q and R respectively

|  | $TiO_2$ | $Al_2O_3$ | $Na_2O$ | $SO_3$ | MgO | $SiO_2$ | $Fe_2O_3$ | CaO | $V_2O_5$ |
|---|---|---|---|---|---|---|---|---|---|
| 14 | 71.9 | 0.2 | 1.1 | 6.7 |  | 0.2 | 11.1 | 6.1 | 2.4 |
| 17 | 2.8 | 0.3 | 8.8 | 44.7 |  | 0.2 | 1.2 | 41.1 | 0.1 |
| 18 | 0.2 | 0.3 | 52.9 | 44.7 | 0.5 | 0.1 | 0.5 | 0.4 | 0.0 |

EXAMPLE 2

Figure 1B:
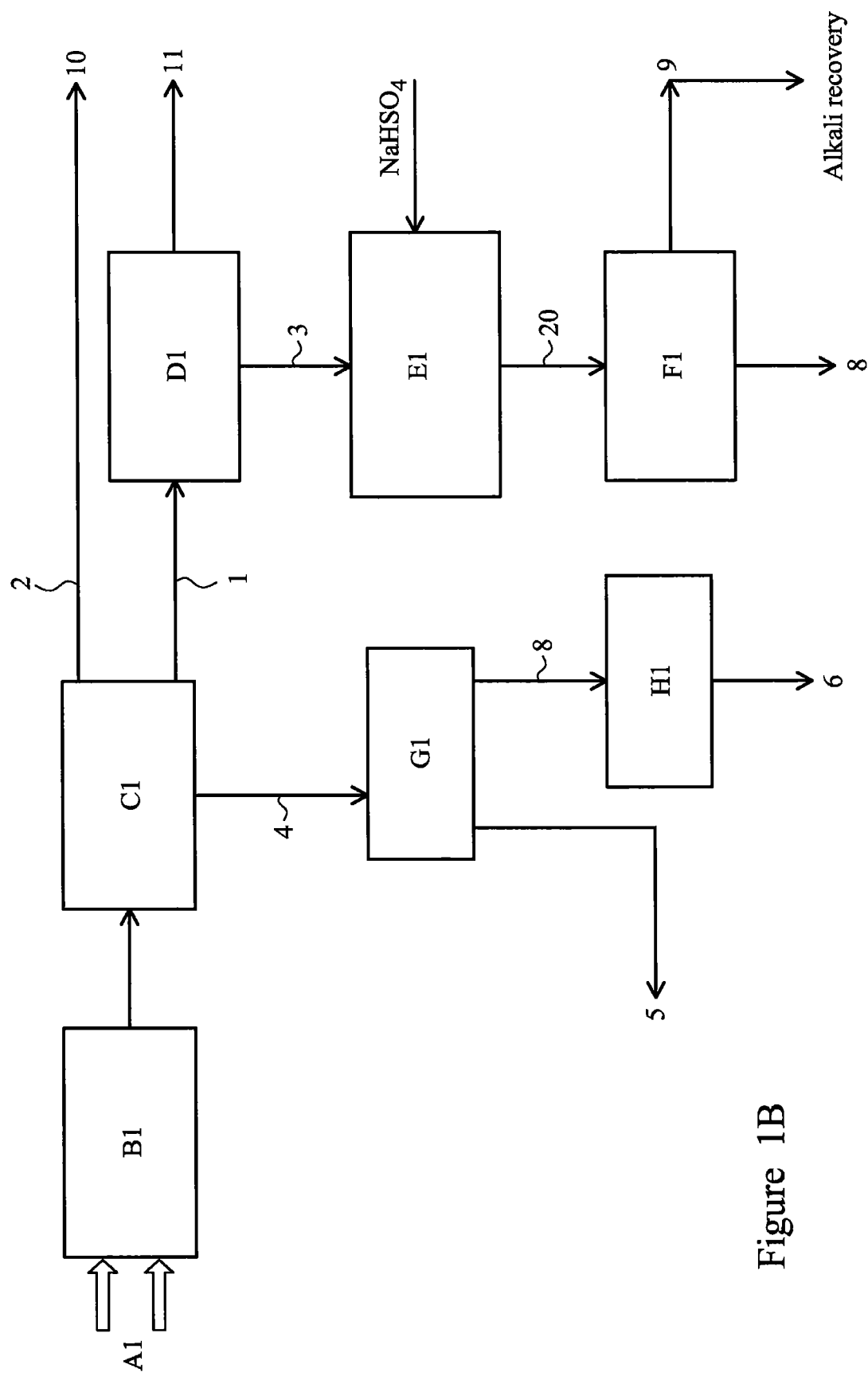
FIG. 1B illustrates a second embodiment of the process of the invention.
Figure 2:
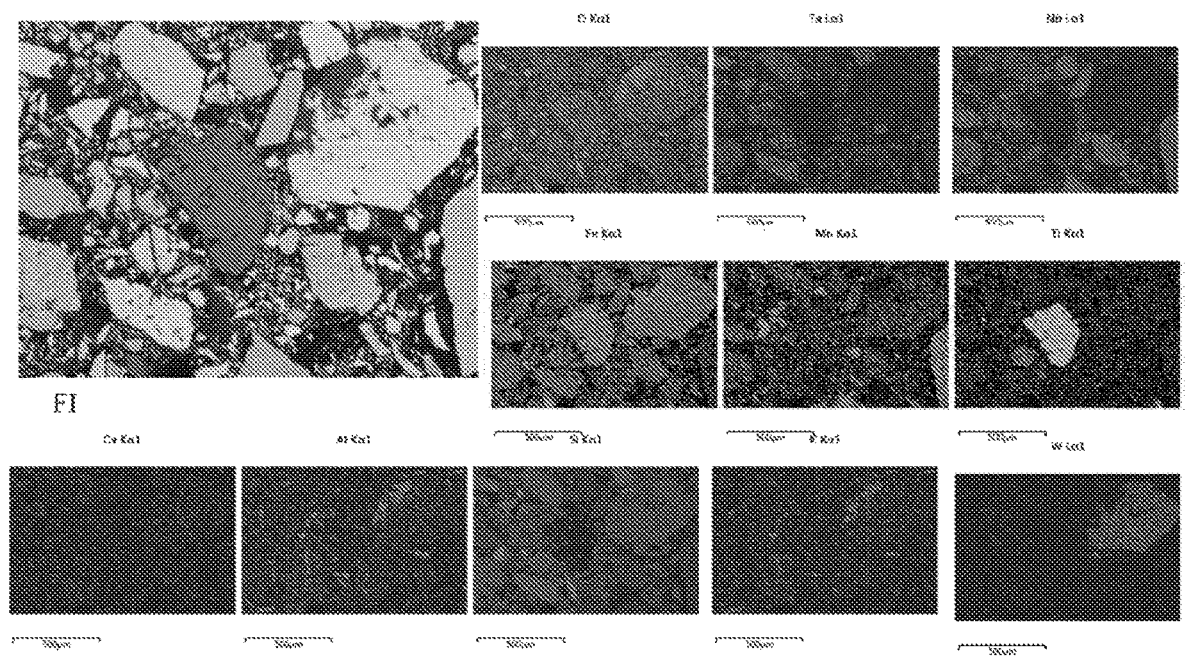
FIG. 2 illustrates the results of a microstructural analysis of columbite concentrates used in the second embodiment of the process of the invention.
Figure 3:
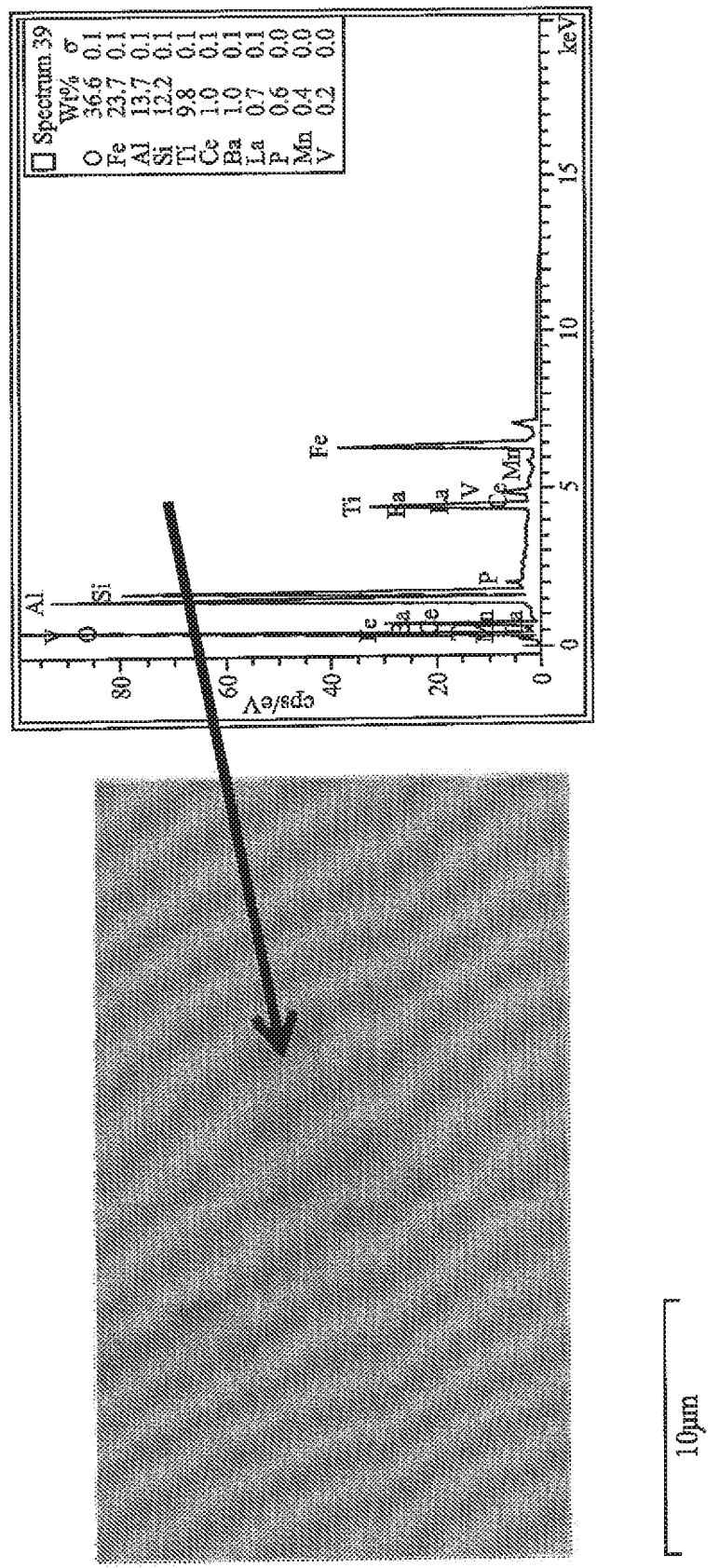
FIG. 3 illustrates the results of a microstructural analysis of columbite concentrates used in the second embodiment of the process of the invention showing the presence of rare earth oxides (REO)

A second embodiment of the process of the invention is illustrated in FIG. 1B. The mineral concentrates processed in Example 2 belonged to the columbite and tantalite families. The chemical composition is shown in Table 10 and the results of a microstructural analysis of the concentrates are shown in FIGS. 2 and 3.

TABLE 10

Chemical composition of columbite and tantalite concentrates
Chemical composition (% wt)

| $Ta_2O_5$ | (4.0-39.0) |
| $Nb_2O_5$ | (14.0-51.0) |
| MnO | (2.0-17.0) |
| $Fe_2O_3$ | (16.0-28.0) |
| $Al_2O_3$ | (1.0-7.0) |
| $SiO_2$ | (2.0-12.0) |
| SnO | (0.8-2.5) |
| Rare earth oxides | (0.0-0.2) |

The material and steps involved in this embodiment were as follows:

A1. A columbite concentrate was mixed as-received with $NaHCO_3$ in the weight ratio alkali:concentrate=1:1 to produce a feedstock.

Figure 4:
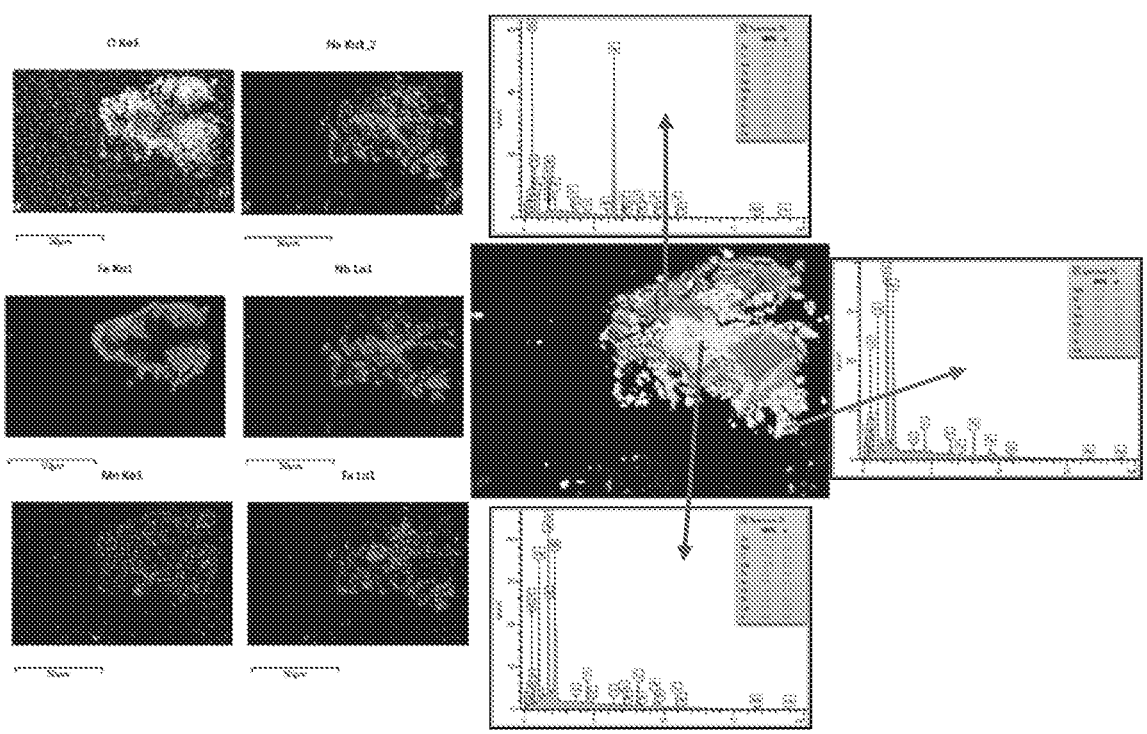
FIG. 4 illustrates the results of a microstructural analysis of the roasted mass from step B1 of the second embodiment of the process of the invention.

B1. The feedstock was roasted isothermally in air at 900° C. for 2 hours to form a roast which was cooled to a roasted mass. During oxidation, alkali complexes of the metallic elements present in the concentrate were formed according to reactions (1) to (7) below. FIG. 4 illustrates the results of a microstructural analysis of the roasted mass showing the formation of transition metal sodium salts.

Figure 7:
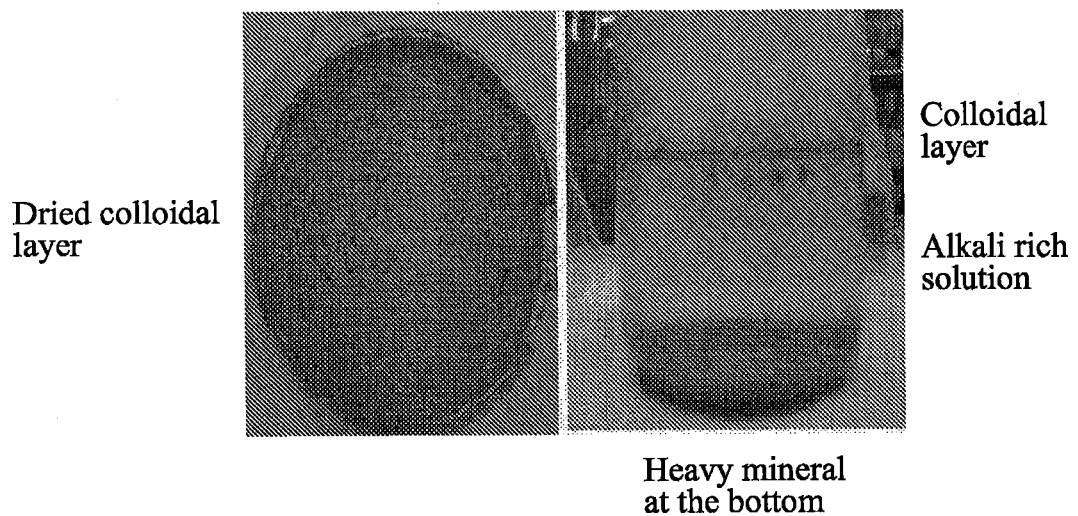
FIG. 7 shows a colloidal layer containing a mixture of rare earth oxides resulting from step Cl of the second embodiment of the invention.

C1. The roasted mass was leached with water at 25-70° C. for 0.5-5.0 hours. The sodium salts of Fe and Mn decomposed to the corresponding hydroxides (reactions (8)-(11)) and sodium titanate was polymerized to sodium octa-titanate (reaction (12)). Tin, aluminium and silica salts were dissolved in a first solution 4 whilst niobium and tantalum salts remained unaltered in a first solid raffinate 1. A colloidal solution 2 with 5 to 30 wt % of mixed rare earth oxides (REO) 10 was recovered from the top surface of the first solution 4 as indicated in FIG. 7.

Figure 8:
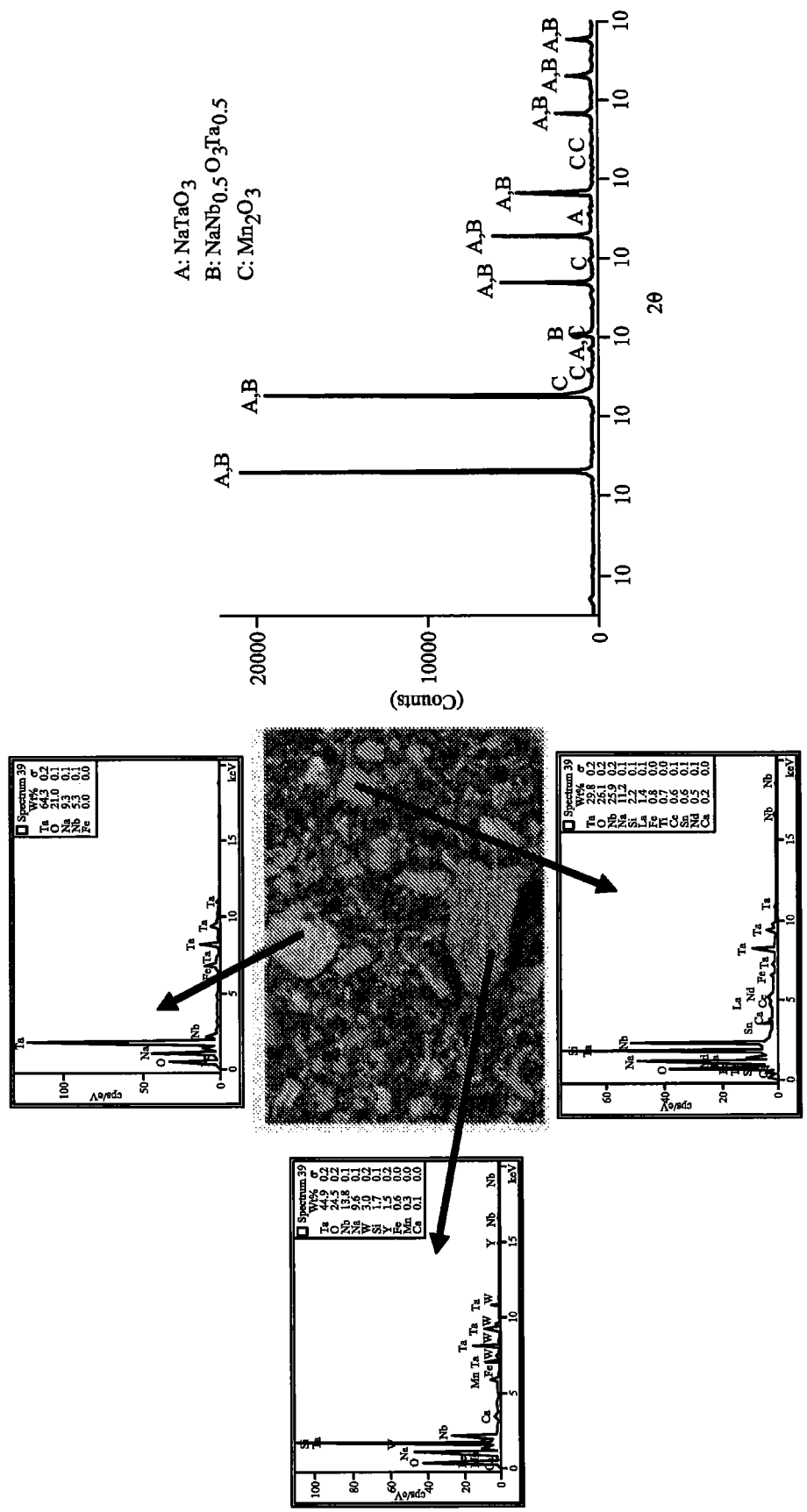
FIG. 8 illustrates SEM/EDX and XRD patterns of a solid raffinate from step D1 of the second embodiment of the invention.

D1. The solid raffinate 1 was leached with a mixture of 10% w/v oxalic acid and 5% w/v ascorbic acid at 25-100° C. in a reductive atmosphere of $Ar-H_2$ for 1-10 hours at a pH below 4. The ascorbic acid enhanced the reduction of iron (III) to iron (II) and the oxalic acid complexed Fe and Mn to form soluble Na, Fe, Mn and Sn oxalates in a second solution 11 (see reactions (16) to (19)). Titanium was obtained as synthetic rutile and niobium and tantalum remain unaltered in a second solid raffinate 3. FIG. 8 illustrates SEM/EDX and XRD patterns of the second solid raffinate 3 showing a content of Mn and Fe lower than 1.5 wt % and combined $Nb_2O_5$ and $Ta2O_5$ of 65 to 70 wt %.

E1. The second solid raffinate 3 and $NaHSO_4$ (ratio in the range 0.2:1 to 3:1) was then roasted in air at 400-700° C. for 0.1 to 4 hour to produce a roasted residue 20. The remaining Ca, Mg and Na formed sulphates as shown in reactions (20) to (23). The presence of Ca and Mg increased the solubility of $Na_2SO_4$.

F1. The roasted residue 20 was leached in water at 25 to 70° C. for 0.5 to 5 hours to remove soluble Ca, Mg, Na, Mn and Fe sulphates in a third solution 9 which could be subjected to recovery of alkali for recycling (by $CO_2$ bubbling for example). A primary metal residue 7 having a concentration of $Nb_2O_5$ and $Ta_2O_5$ of 79 to 90 wt % was obtained.

G1. Carbon dioxide was bubbled through the first solution 4 at 60 to 90° C. to allow the recovery of tin, aluminium silicate and excess alkali (reactions (13) to (15)) in an alumina-rich precipitate 5 (75 to 80 wt %).

H1. The solution 8 separated after step G1 was evaporated to crystallise sodium carbonate 6 which can be recycled. The purity of the sodium carbonate was 85-90 wt %.

Reactions $$Fe(TaO_3)_2(s)+3NaHCO_3(s)+O_2(g)\rightarrow 2NaTaO_3(s)+NaFeO_2(s)+3CO_2(g)+3/2H_2O(g) \quad (1)$$

$$Fe(NbO_3)_2(s)+3NaHCO_3(s)+O_2(g)\rightarrow 2NaNbO_3(s)+NaFeO_2(s)+3CO_2(g)+3/2H_2O(g) \quad (2)$$

$$Mn(TaO_3)_2(s)+4NaHCO_3(s)+O_2(g)\rightarrow 2NaTaO_3(s)+Na_2MnO_4(s)+4CO_2(g)+2H_2O(g) \quad (3)$$

$$Mn(NbO_3)_2(s)+4NaHCO_3(s)+O_2(g)\rightarrow 2NaNbO_3(s)+Na_2MnO_4(s)+4CO_2(g)+2H_2O(g) \quad (4)$$

$$SnO_2(s)+2NaHCO_3(s)\rightarrow Na_2SnO_3(s)+2CO_2(g)+H_2O(g) \quad (5)$$

$$TiO_2(s)+2NaHCO_3(s)\rightarrow Na_2TiO_3(s)+2CO_2(g)+H_2O(g) \quad (6)$$

$$Al_2Si_2O_5(s)+4NaHCO_3(s)\rightarrow Na_2SiO_3(s)+2NaAlO_2(s)+4CO_2(g)+2H_2O(g) \quad (7)$$

$$NaFeO_2(s)+H_2O(l)\rightarrow Fe_2O_3(s)+2NaOH(a) \quad (8)$$

$$Fe_2O_3(s)+3H_2O(l)\rightarrow 2Fe(OH)_3(s) \quad (9)$$

$$Na_2MnO_4(s)+H_2O(l)\rightarrow Mn_2O_3(s)+2NaOH(a) \quad (10)$$

$$Mn_2O_3(s)+3H_2O(l)\rightarrow Mn(OH)_2(s)+2OH^- \quad (11)$$

$$5Na_2TiO_3(s)+H_2O(l)\rightarrow Na_8Ti_5O_{14}(s)+2NaOH(a) \quad (12)$$

$$2NaAlO_2(a)+Na_2SiO_3+2CO_2(g)\rightarrow Al_2SiO_5(s)+2Na_2CO_3(a) \quad (13)$$

$$Na_2SnO_3(a)+2CO_2(g)\rightarrow SnO_2(s)+Na_2CO_3(a) \quad (14)$$

$$2NaOH(a)+CO_2(g)\rightarrow Na_2CO_3(a)+H_2O(l) \quad (15)$$

$$Fe(OH)_3(s)+C_6H_8O_6(a)\rightarrow Fe(OH)_2(s)+C_6H_6O_6(a)+H_2O(l) \quad (16)$$

$$Fe(OH)_2(s)+H_2C_2O_4(a)\rightarrow FeC_2O_4(a)+2H_2O(l) \quad (17)$$

$$Mn(OH)_2(s)+H_2C_2O_4(a)\rightarrow MnC_2O_4(a)+2H_2O(l) \quad (18)$$

$$Na_8Ti_5O_{14}(s)+4H_2C_2O_4(a)\rightarrow 5\,TiO_2(s)+4\,Na_2C_2O_4(a)+4H_2O(l) \quad (19)$$

$$CaO(s)+2NaHSO_4(s)\rightarrow Na_2Ca(SO_4)_2(s)+H_2O(g) \quad (20)$$

$$MgO(s)+2NaHSO_4(s)\rightarrow Na_2Mg(SO_4)_2(s)+H_2O(g) \quad (21)$$

$$2NaNbO_3(s)+2NaHSO_4(s)\rightarrow Nb_2O_5(s)+2Na_2SO_4(s)+H_2O(g) \quad (22)$$

$$2NaTaO_3(s)+2NaHSO_4(s)\rightarrow Ta_2O_5(s)+2Na_2SO_4(s)+H_2O(g) \quad (23)$$

EXAMPLE 3

Figure 1C:
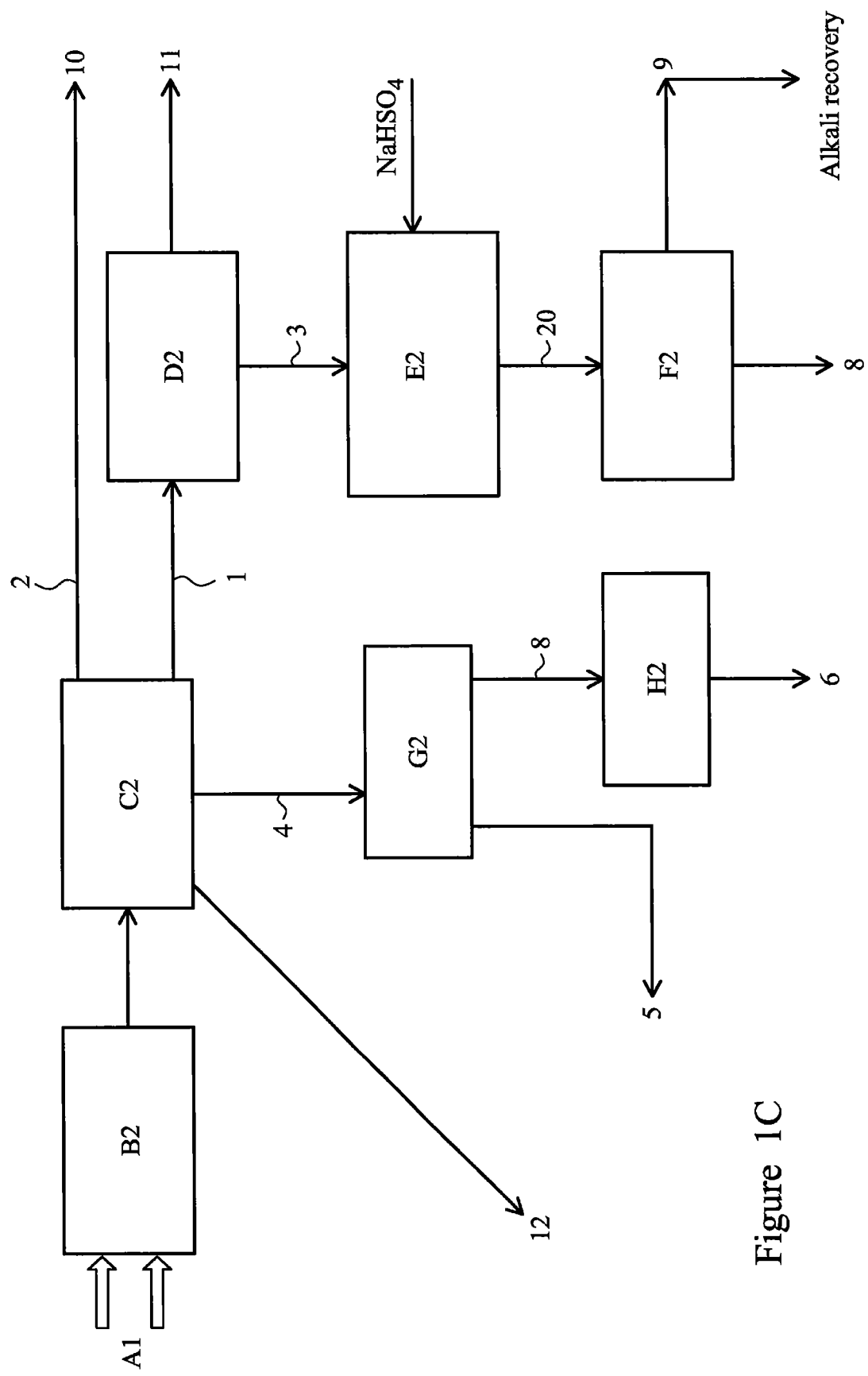
FIG. 1C illustrates a third embodiment of the process of the invention.

A third embodiment of the process of the invention is illustrated in FIG. 1C. The mineral concentrates processed in Example 3 are the same as those used in Example 2 (see Table 10 and FIGS. 2 and 3). The material and steps involved in each stage were as follows:

A2. A columbite concentrate was mixed as-received with $NaHCO_3$ and charcoal in the weight ratio concentrate: $NaHCO_3$:carbon=1:0.75:0.05 to produce a feedstock.

Figure 5:
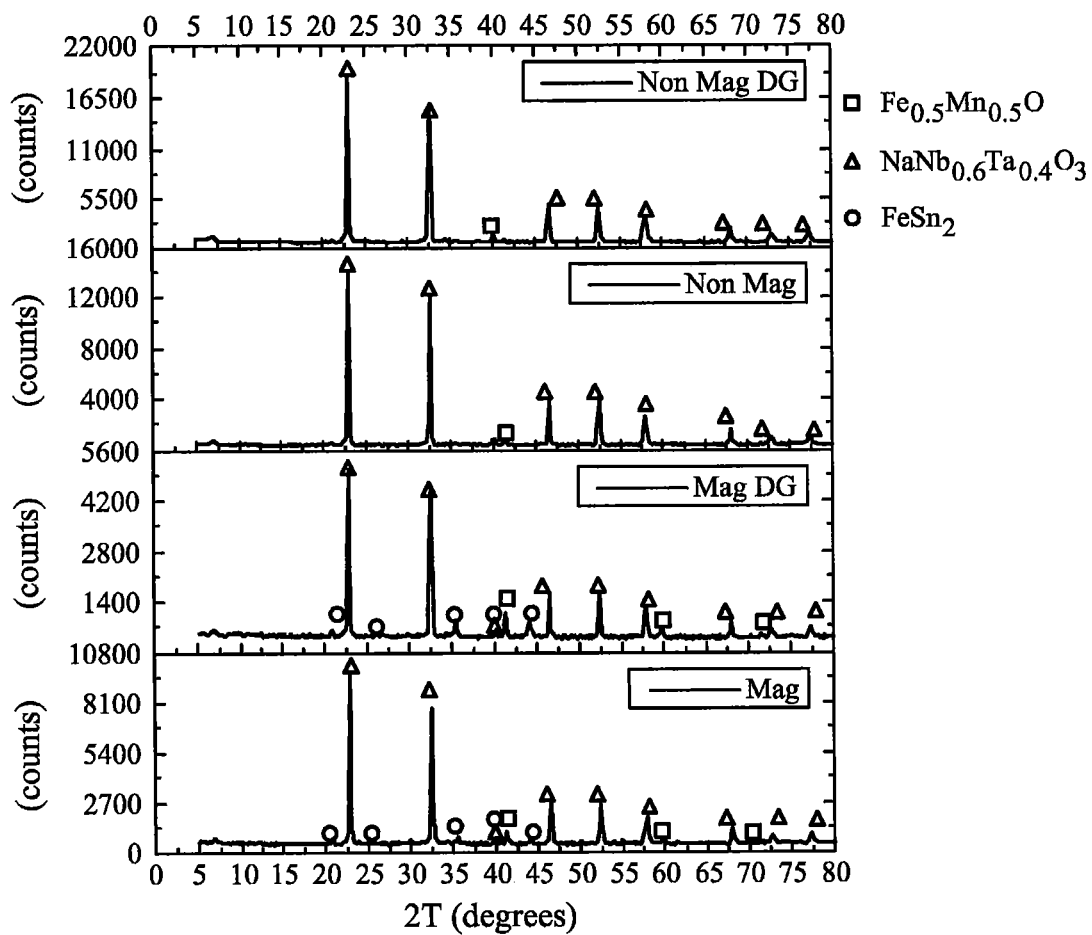
FIG. 5 illustrates X-ray powder diffraction patterns of the roasted mass from step B2 of the third embodiment of the process of the invention.
Figure 6:
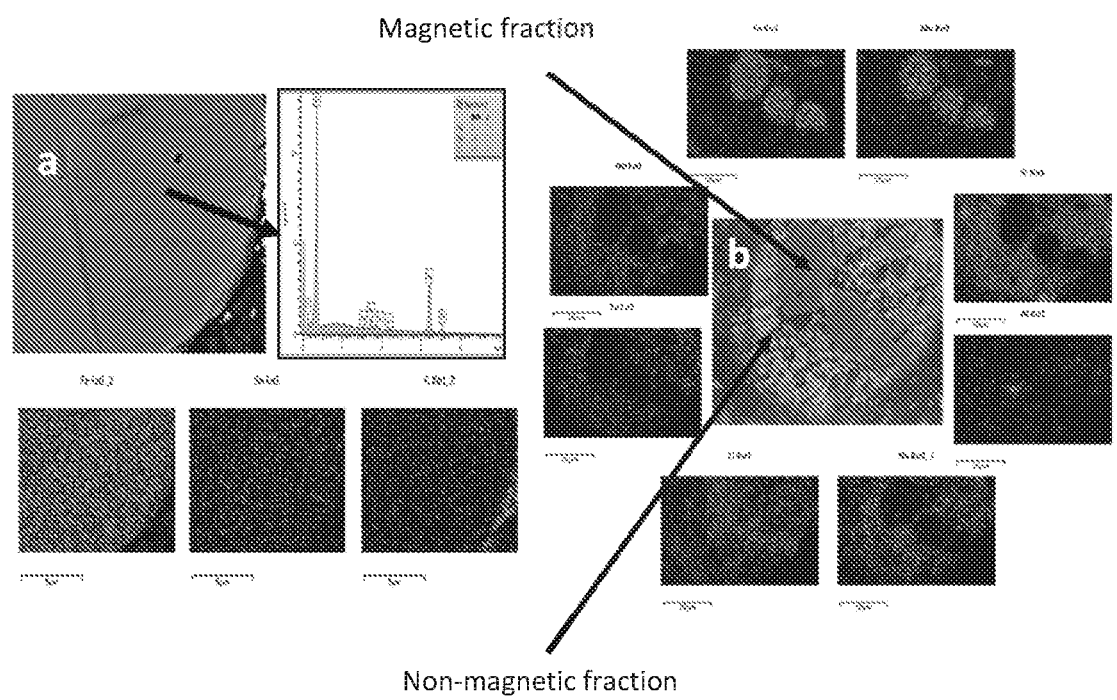
FIG. 6 illustrates the results of a microstructural analysis of the roasted mass from step B2 of the third embodiment of the process of the invention showing selective separation of Fe, Mn and Sn.

B2. The feedstock was reductively roasted in argon (1-10 L/min) at 1050° C. for 1.5 hours to form a roast. During reduction, sodium salts of niobium, tantalum, titanium, aluminium and silicon were formed. Iron reacted with manganese and tin to form a double oxide and a metallic alloy respectively. The reactions are indicated below. The roast was cooled to form a roasted mass (referred to as DG) which was ground for XRD analysis (FIG. 5) and for microstructural analysis (FIG. 6). This showed phase segregation into a magnetic phase rich in Fe, Mn and Sn and a non-magnetic phase which hosted the sodium salts of niobium and tantalum and sodium aluminium silicates.

C2. The ground roasted mass was made up into a slurry and subjected to wet magnetic separation in the arrangement described above with reference to FIG. 13. This separated out a magnetic fraction 12 (30-60wt % Fe, 1-4wt % Sn and 2-3wt % Mn) and a non-magnetic fraction 1. A colloidal solution 2 with 5 to 30wt % of mixed rare earth oxides (REO) 10 was recovered from the top surface of a first solution 4. The magnetic fraction 12 may be smelted to obtain steel.

Steps D2-H2 are analogous to steps D1-H1 specified in Example 2 and materials 3 to 9 and 20 are analogous to those produced in Example 2.

$$Fe(TaO_3)_2(s)+2NaHCO_3(s)\rightarrow 2NaTaO_3(s)+FeO(s)+2CO_2(g)+H_2O(g)$$

$$Fe(NbO_3)_2(s)+2NaHCO_3(s)\rightarrow 2NaNbO_3(s)+FeO(s)+2CO_2(g)+H_2O(g)$$

$$Mn(TaO_3)_2(s)+2NaHCO_3(s)\rightarrow 2NaTaO_3(s)+MnO(s)+2CO_2(g)+H_2O(g)$$

$$Mn(NbO_3)_2(s)+2NaHCO_3(s)\rightarrow 2NaNbO_3(s)+MnO(s)+2CO_2(g)+H_2O(g)$$

$$FeO(s)+MnO(s)\rightarrow FeMnO(s)+1/2O_2(g)$$

$$32FeO(s)+SnO_2(s)+17C(s)\rightarrow Fe_{32}Sn(s)+17CO_2(g)$$

$$TiO_2(s)+2NaHCO_3(s)\rightarrow Na_2TiO_3(s)+2CO_2(g)+H_2O(g)$$

$$Al_2Si_2O_5(s)+4NaHCO_3(s)\rightarrow Na_2SiO_3(s)+2NaAlO_2(s)+4CO_2(g)+2H_2O(g).$$

The invention claimed is:

1. A process for recovering a primary metal residue from a metal-containing composition comprising:
   (a) preparing a feedstock of the metal-containing composition and an alkali salt;
   (b) reductively roasting the feedstock at a roasting temperature for a roasting period to produce a roast;
   (c) cooling the roast to produce a roasted mass containing metallic iron or an alloy or compound thereof and soluble metal oxides;
   (d) adding an aqueous medium to the roasted mass to form a substantially insoluble product and a first solution of soluble metal oxides;
   (e) acid leaching the substantially insoluble product or a fraction thereof to produce a leach residue and a second solution of soluble metal oxides;
   (f) roasting the leach residue in the presence of a bisulphate or bicarbonate of an alkali metal or alkaline earth metal to produce a roasted residue; and
   (g) hydrometallurgically extracting from the roasted residue the primary metal residue and a third solution of soluble metal oxides.

2. The process as claimed in claim 1, wherein the bisulphate or bicarbonate of an alkali metal or alkaline earth metal is a bisulphate or bicarbonate of an alkali metal.

3. The process as claimed in claim 1, wherein the bisulphate or bicarbonate of an alkali metal or alkaline earth metal is $NaHSO_4$.

4. The process as claimed in claim 1, further comprising: recovering one or more metal value-containing precipitates from the first solution of soluble metal oxides.

5. The process as claimed in claim 1, further comprising: recovering one or more metal value-containing precipitates from the third solution of soluble metal oxides.

6. The process as claimed in claim 1, further comprising:
(d1) separating a rare earth oxides-containing colloidal solution from the surface of the first solution of soluble metal oxides.

7. The process as claimed in claim 1, wherein the metal-containing composition is titanium rich.

8. The process as claimed in claim 7, wherein the metal-containing composition is a titanium ore concentrate.

9. The process as claimed in claim 7, wherein the primary metal residue is $TiO_2$.

10. The process as claimed in claim 7, further comprising: recovering one or more sodium or vanadium values from the first solution of soluble metal oxides.

11. The process as claimed in claim 7, further comprising: recovering one or more sodium values from the third solution of soluble metal oxides.

12. The process as claimed in claim 7, further comprising: recovering one or more titanium values from the third solution of soluble metal oxides.

13. The process as claimed in claim 7, further comprising: recovering one or more iron values from the third solution of soluble metal oxides.

14. The process as claimed in claim 7, further comprising: recovering one or more vanadium values from the third solution of soluble metal oxides.

15. The process as claimed in claim 7, further comprising: recovering one or more calcium values from the third solution of soluble metal oxides.

16. The process as claimed in claim 1, further comprising:
(d2) magnetically separating from the substantially insoluble product a magnetic fraction and a substantially non-magnetic fraction,
wherein step (e) is: acid leaching the substantially non-magnetic fraction to produce a leach residue and a second solution of soluble metal oxides.

17. The process as claimed in claim 1, further comprising:
(d3) smelting the magnetic fraction to produce a steel residue and a non-magnetic slag.

18. The process as claimed in claim 17, further comprising:
(d3a) acid leaching the non-magnetic slag to produce a slag leach residue and a fourth solution of soluble metal oxides;
(d3b) roasting the slag leach residue in the presence of a bisulphate or bicarbonate of an alkali metal or alkaline earth metal to produce a roasted slag leach residue; and
(d3c) hydrometallurgically extracting from the roasted slag leach residue a secondary metal residue and a fifth solution of soluble metal oxides.

19. The process as claimed in claim 1, wherein step (b) is: oxidatively roasting the feedstock at a roasting temperature for a roasting period to produce a roast, wherein step (e) is: acid leaching the substantially insoluble product to produce a leach residue and a second solution of soluble metal oxides.

* * * * *

UNITED STATES PATENT AND TRADEMARK OFFICE
CERTIFICATE OF CORRECTION

PATENT NO. : 10,508,320 B2  
APPLICATION NO. : 15/555144  
DATED : December 17, 2019  
INVENTOR(S) : Animesh Jha et al.

It is certified that error appears in the above-identified patent and that said Letters Patent is hereby corrected as shown below:

In the Specification

Column 2, Cross-Reference to Related Applications, Line 8, Delete "$Nb_2O_5$generally" and insert --$Nb_2O_5$ generally-- therefor Column 9, Cross-Reference to Related Applications, Line 2, Delete "Cl" and insert --C1-- therefor Column 9, Cross-Reference to Related Applications, Line 11, Delete "$Al_2O_3V_2O_5$" and insert --$Al_2O_3$-$V_2O_5$-- therefor Column 10, Cross-Reference to Related Applications, Line 38, Delete "$V_1O_5$" and insert --$V_2O_5$-- therefor Column 12, Cross-Reference to Related Applications, Line 9, Delete "$Na_2SO_4NaHSO_4(HNa_3(SO_4)_2)$." and insert --$Na_2SO_4$ $NaHSO_4$ $(HNa_3(SO_4)_2)$.-- therefor Column 12, Cross-Reference to Related Applications, Line 26, Reaction 7, Delete "$Fe_2(SO_4)_3 3Na_2SO_4=2Na_3Fe(SO_4)_3$" and insert --$Fe_2(SO_4)_3+3Na_2SO_4=2Na_3Fe(SO_4)$-- therefor Column 14, Cross-Reference to Related Applications, Line 49, Delete "Ta2O5" and insert --$Ta_2O_5$-- therefor Signed and Sealed this  
Twelfth Day of May, 2020

Andrei Iancu  
*Director of the United States Patent and Trademark Office*